(12) United States Patent
Castaneda et al.

(10) Patent No.: US 10,593,100 B1
(45) Date of Patent: Mar. 17, 2020

(54) METHODS AND SYSTEMS FOR REPRESENTING A SCENE BY COMBINING PERSPECTIVE AND ORTHOGRAPHIC PROJECTIONS

(71) Applicant: Verizon Patent and Licensing Inc., Arlington, VA (US)

(72) Inventors: Oliver S. Castaneda, Jersey City, NJ (US); Joshua Shadik, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 14 days.

(21) Appl. No.: 16/124,611

(22) Filed: Sep. 7, 2018

(51) Int. Cl.
*G06T 15/10* (2011.01)
(52) U.S. Cl.
CPC .................................. *G06T 15/10* (2013.01)
(58) Field of Classification Search
None
See application file for complete search history.

(56) References Cited

U.S. PATENT DOCUMENTS

| | | | |
|---|---|---|---|
| 2009/0009593 A1* | 1/2009 | Cameron | H04N 13/363 348/51 |
| 2011/0018902 A1* | 1/2011 | Ofek | G06T 3/4038 345/629 |
| 2016/0005229 A1* | 1/2016 | Lee | G06F 3/0488 345/419 |

* cited by examiner

*Primary Examiner* — Yanna Wu

(57) ABSTRACT

An exemplary virtual reality content generation system manages state data representing a virtual reality scene. Based on the state data, the system generates a scene representation of the virtual reality scene that includes a set of surface data frame sequences each depicting a different projection of the virtual reality scene from a different vantage point. The different projections include a plurality of orthographic projections that are generated based on orthographic vantage points and are representative of a core portion of the virtual reality scene. The different projections also include a plurality of perspective projections that are generated based on perspective vantage points and are representative of a peripheral portion of the virtual reality scene external to the core portion. The system further provides the scene representation to a media player device by way of a network.

20 Claims, 17 Drawing Sheets

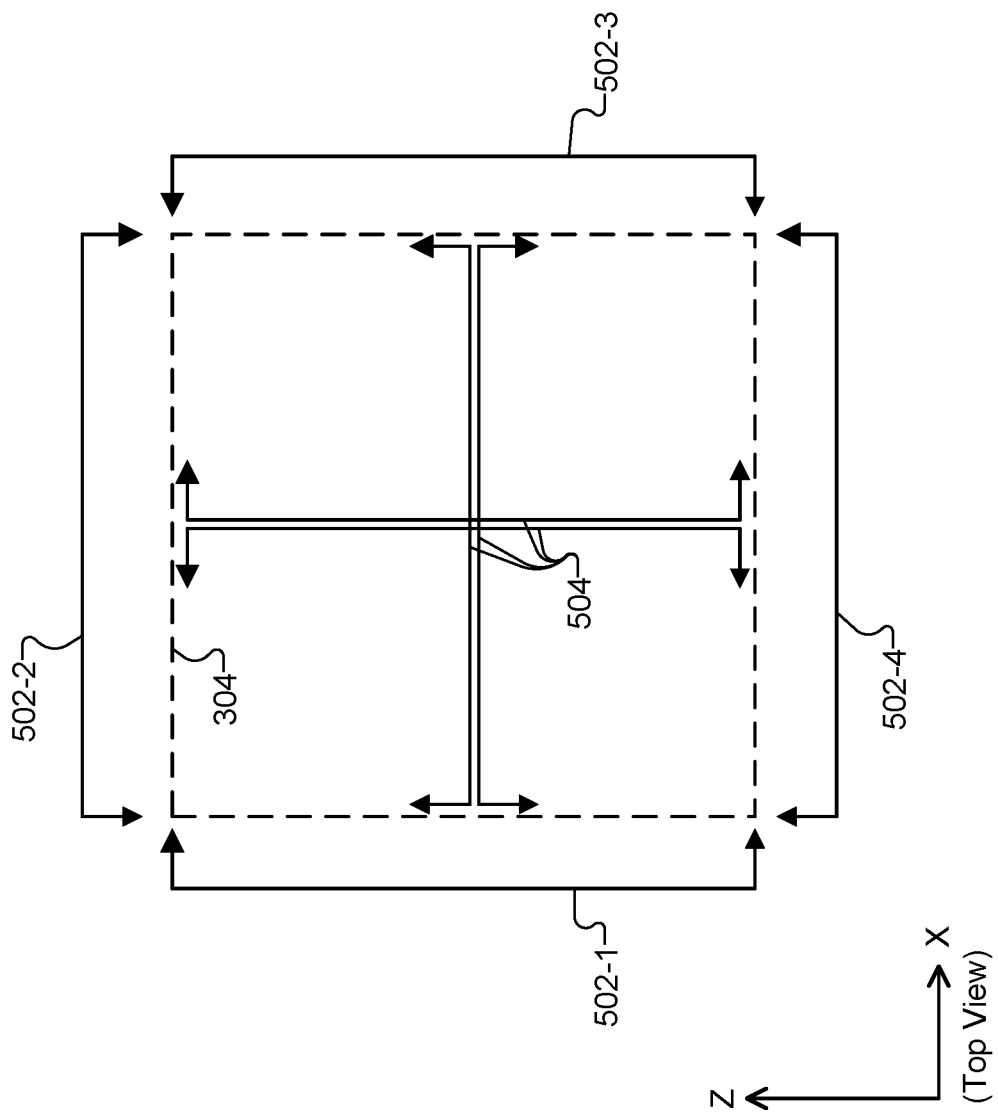

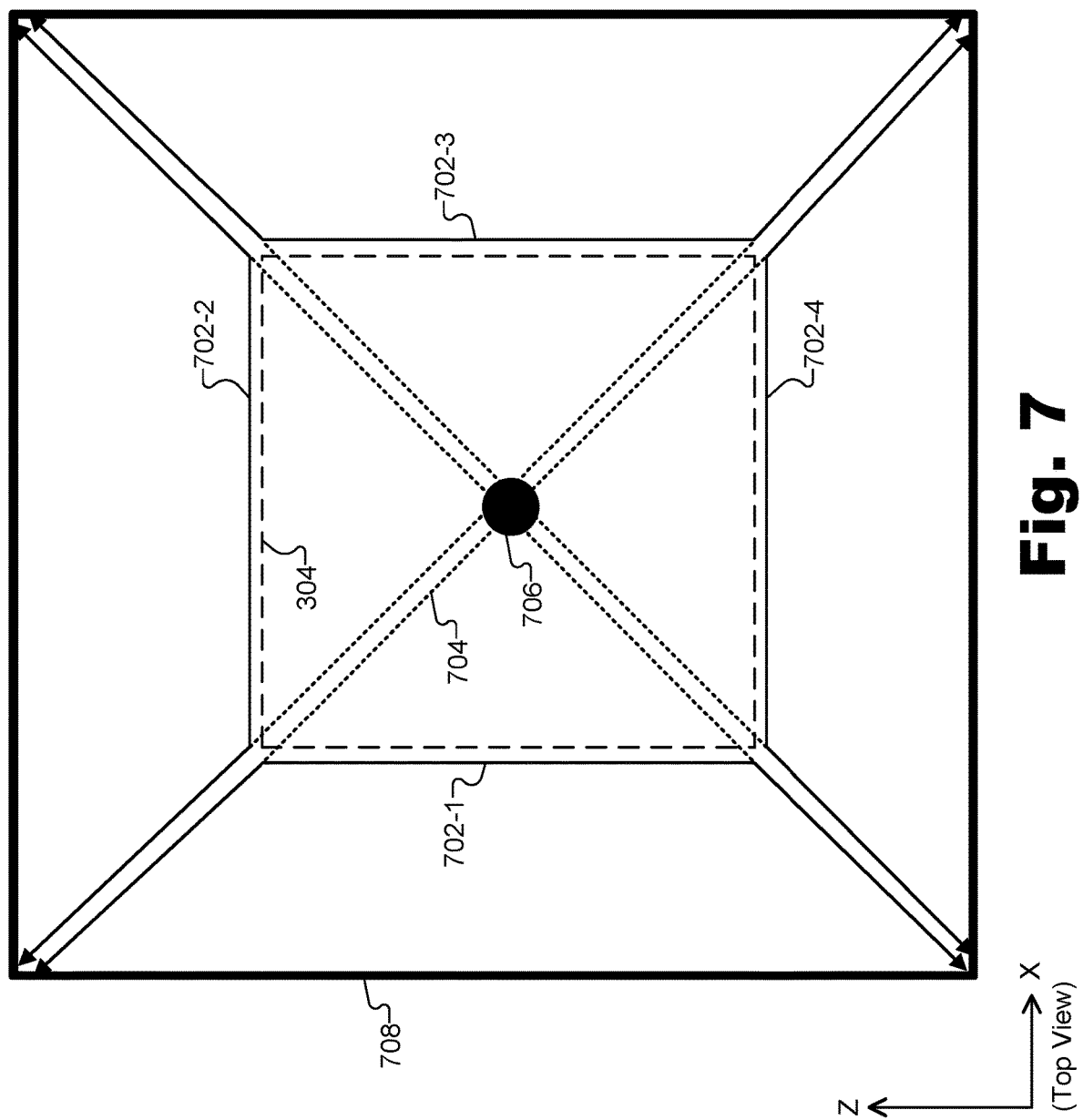

| Color Data 902-O1 | Color Data 902-O2 | Color Data 902-O3 | Color Data 902-O4 | Color Data 902-O5 |
|---|---|---|---|---|
| Color Data 902-O6 | Color Data 902-P1 | Color Data 902-P2 | Color Data 902-P3 | Color Data 902-P4 |
| Color Data 902-P5 | Color Data 902-P6 | Depth Data 904-O1 | Depth Data 904-O2 | Depth Data 904-O3 |
| Depth Data 904-O4 | Depth Data 904-O5 | Depth Data 904-O6 | Depth Data 904-P1 | Depth Data 904-P2 |
| Depth Data 904-P3 | Depth Data 904-P4 | Depth Data 904-P5 | Depth Data 904-P6 | Other Data 1004 |

Fig. 10

METHODS AND SYSTEMS FOR REPRESENTING A SCENE BY COMBINING PERSPECTIVE AND ORTHOGRAPHIC PROJECTIONS

BACKGROUND INFORMATION

Various immersive technologies (e.g., virtual reality technology, augmented reality technology, mixed reality technology, etc.) allow users of media player devices to experience immersive scenes that are different from a real-world environment within which the users and media player devices actually exist. For example, a virtual reality scene may be generated based on camera-captured scenery of a real-world scene or virtually-rendered scenery of a virtualized scene. Using an immersive technology such as virtual reality technology, users experience simulated scenes that may be difficult, expensive, or impossible to experience otherwise. Accordingly, virtual reality technology may provide users with a variety of entertainment, educational, vocational, and/or other enjoyable or valuable experiences that may otherwise be difficult or inconvenient for the users to obtain.

In some examples, virtual reality data is streamed from a content generation system to a user's media player device over a network. For instance, a scene representation of a virtual reality scene may be transmitted to a media player device in real time as the user experiences the virtual reality scene by way of the media player device. To present a virtual reality scene perfectly, it would be desirable for the scene representation to include an unlimited number of different projections from every possible vantage point on the virtual reality scene. Unfortunately, various resource limitations (e.g., limited network bandwidth, limited computing resources of the content generation system for generating projections, limited computing resources of media player devices for rendering and presenting content, etc.) prevent systems from achieving this theoretical ideal. Instead, the systems may strategically select projections to prepare and provide as part of a scene representation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 5 illustrates an exemplary plurality of orthographic vantage points directed inwardly toward one another and toward an exemplary core portion of the virtual reality scene of FIG. 3 according to principles described herein.

FIG. 7 illustrates an exemplary plurality of perspective vantage points directed outwardly away from one another and toward an exemplary peripheral portion of the virtual reality scene of FIG. 3 according to principles described herein.

FIGS. 9 and 10 illustrate different exemplary data structures for transporting a scene representation including a set of surface data frame sequences according to principles described herein.

DETAILED DESCRIPTION OF PREFERRED EMBODIMENTS

Figure 1:
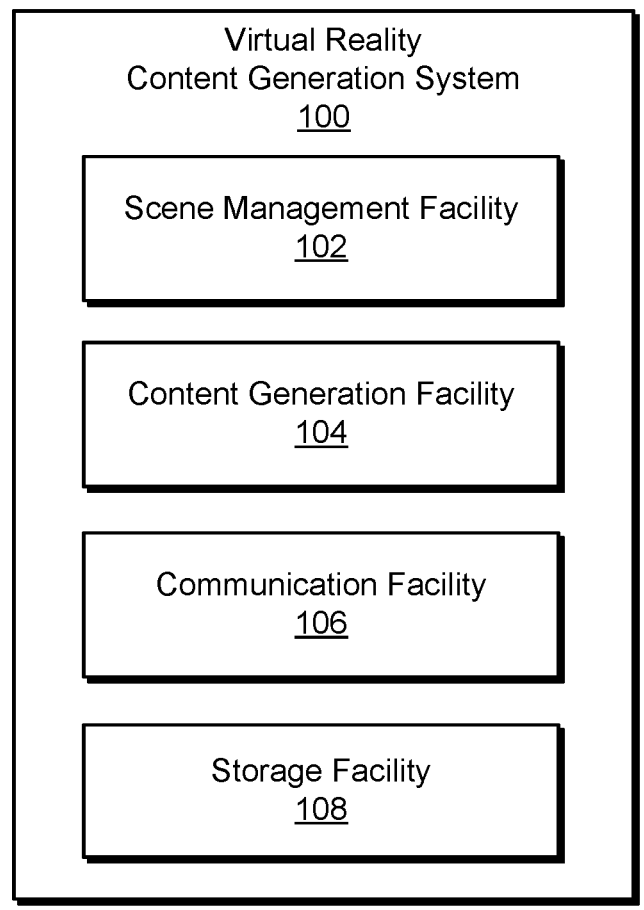
FIG. 1 illustrates an exemplary virtual reality content generation system for representing a scene by combining perspective and orthographic projections according to principles described herein.

Methods and systems for representing a scene by combining perspective and orthographic projections are described herein. More specifically, the methods and systems described herein combine orthographic-based and perspective-based approaches for representing a scene (e.g., a virtual reality scene or the like) to leverage advantages of both approaches in various ways that will be described. For example, as will be described in more detail below, orthographic projections may be advantageous for representing a core portion of a scene while perspective projections may be advantageous for representing a peripheral portion of the scene. Both types of projections may thus be employed together in a single scene representation to complement one another (i.e., provide benefits associated with each approach while avoiding downsides of both approaches) in any of the ways described herein.

In one implementation, for example, an exemplary virtual reality content generation system may manage state data for a scene. For example, the scene may be a virtual reality scene (e.g., any type of immersive scene as may be presented to a user using a media player device) that is based on camera-captured footage of a real-world scene, that is generated based on virtual scenery, and/or that is generated based on any other suitable content as may serve a particular implementation. The state data managed by the virtual reality content generation system may be representative of a state of a volumetric representation of the virtual reality scene as the state changes over time. For example, the virtual reality system may generate a three-dimensional ("3D") model of the virtual reality scene and may manage, maintain, and update that 3D model over time as the user experiences and interacts with the virtual reality scene represented by the 3D model.

Based on the managed state data, the virtual reality content generation system may generate a scene representation of the virtual reality scene. Rather than representing the scene as a volumetric representation, it may be more efficient and/or otherwise advantageous to represent the scene using a plurality of frame sequences (e.g., two-dimensional ("2D") videos) that may be transmitted over a network using available technologies and infrastructures for transmitting video, and that may then be rendered in such a way as to present the virtual reality scene from an arbitrary, user-selectable viewpoint. For example, the scene representation may include a set of surface data frame sequences (e.g., frame sequences that include both color data and depth data) that each depict a different projection of the virtual reality scene from a different vantage point.

In particular, the virtual reality content generation system may generate, within the surface data frame sequences making up the scene representation, a combination of orthographic projections and perspective projections. As used herein, an orthographic projection refers to a rendering or other projection of color data and/or depth data in which 3D surfaces of 3D objects are projected onto a 2D projection plane by a parallel projection in which projection lines are all orthogonal to the projection plane. In contrast, as used herein, a perspective projection refers to a rendering or other projection of color data and/or depth data in which 3D surfaces of 3D objects are projected onto a 2D projection plane by a projection in which projection lines are not parallel, but, rather, diverge (e.g., from a common point or from a planar area). Orthographic and perspective projections will be described and illustrated in more detail below.

The combination of orthographic projections and perspective projections generated by the virtual reality content generation system may include a plurality of orthographic projections and a plurality of perspective projections. The plurality of orthographic projections may be generated based on a plurality of orthographic vantage points, and may be representative of a core portion of the virtual reality scene. For instance, the orthographic vantage points may be positioned at virtual locations defining a boundary of a core portion of the virtual reality scene, and may be directed inwardly toward one another and toward the core portion of the virtual reality scene so as to uniformly cover the area within the boundary in accordance with a rectangular grid as will be described in more detail below. To complement the plurality of orthographic projections, the plurality of perspective projections may be generated based on a plurality of perspective vantage points and may be representative of a peripheral portion of the virtual reality scene external to the core portion. For example, the perspective vantage points may be positioned on or within the boundary of the core portion, and may be directed outwardly away from one another and toward the peripheral portion.

As each frame of each surface data frame sequence included in the scene representation is generated and prepared, the virtual reality content generation system may provide (e.g., transmit, stream, etc.) the scene representation of the virtual reality scene to a media player device. For example, the virtual reality content generation system may provide the scene representation to the media player device by way of a network using established frame sequence communication technologies (e.g., video encoding and transmission technologies). Additional details and various other exemplary methods and systems for representing a scene by combining perspective and orthographic projections will be described and illustrated in more detail below.

Methods and systems described herein for representing a scene by combining perspective and orthographic projections may provide various advantages and benefits. For example, as mentioned above, by combining both types of projections into a scene representation in the ways described herein, virtual reality content generation systems may leverage various benefits of both orthographic-based and perspective-based approaches for representing a scene while avoiding various downsides inherent in either approach when used alone.

Different types of projections have different strengths and weaknesses for depicting a scene because different portions of a scene tend to be viewed differently by users experiencing the scene (e.g., virtually experiencing a virtual reality scene). For example, the portion of a scene in immediate proximity to the user position at any given moment may be the portion that calls for the most detailed and thorough representation because it is the portion that the user can see most clearly, explore most directly, and so forth. Objects nearby the user position within the scene may be walked around and viewed from various different angles, for instance, thus making it important for such objects to be thoroughly represented so that they can be flexibly rendered and depicted from any viewpoint from which a user may wish to view the objects.

Orthographic projections may be ideal for representing these portions of the scene immediately proximate to (e.g., surrounding) the user position. For example, due to various aspects inherent to orthographic vantage points that will be described below, orthographic projections may be conveniently structured to thoroughly represent a well-defined area using a grid-like structure or the like. Within this area, all objects represented within the orthographic projections may be automatically represented in full detail, without any natural downsampling that would reduce the resolution or detail with which the objects are represented. By using orthographic projections to represent such portions of a scene, detrimental aspects of perspective projections in representing these portions may be also be advantageously avoided. For example, unlike orthographic projections, perspective projections automatically downsample (i.e., reduce the representation quality of) object representations in accordance with how proximate the objects are to respective perspective vantage points associated with the perspective projections, as will be illustrated and described in more detail below. This may be undesirable for representing objects within a scene portion immediately proximate to a user position because it may be desirable for all of the objects in this scene portion to be represented with as much detail as possible (i.e., such that no details are removed due to downsampling) for the reasons described above.

In contrast to the portions immediately proximate to the user position, portions of a scene that are more distant from the user position may not require such a thorough and detailed representation because the objects in such portions are viewed by users as background objects that cannot be directly explored from very many angles without moving closer to the objects. Indeed, not only do such portions not require a thorough and detailed representation, but providing such a representation may be wasteful and inefficient due to the limited detail that the user is capable of appreciating from the user position relatively distant from the scene portions.

Perspective projections may be ideal for representing these portions of the scene that are not immediately proximate to the user position. For example, whereas the natural downsampling described above to be inherent in perspective projections may be problematic for representing objects proximate to the user, this natural downsampling may be advantageous for representing objects that are further away from the user position and for which high levels of detail cannot be appreciated by the user even if they were included in the representation. Because the downsampling naturally occurs based on the distance of an object from a perspective vantage point, closer objects may be represented with higher levels of detail while more distant objects may be represented with lower levels of detail automatically by merely employing the perspective projection. In this way, a major weakness of orthographic projections in efficiently representing distant objects may be avoided while representing the non-proximate portions of the scene. Specifically, the virtual reality content generation system may efficiently represent distant objects according to the level of detail that a user may actually be able to appreciate from a certain user position without performing any processing to manually downsample representations of the distant objects (as would be required if using an orthographic projection) because the representations are naturally downsampled by the perspective projections.

By leveraging the differences between the different types of projections in representing different portions of a virtual reality scene, the virtual reality content generation system may become more efficient while simultaneously providing higher quality content to media player devices. This efficiency allows higher quality scenes to be generated and provided, thereby leading to better experiences by users, more realistic and immersive representations of virtual reality scenes, and so forth. Additionally, these advances in quality and efficiency may allow larger immersive worlds with larger immersive scenes to be generated and distributed to larger numbers of users without requiring future advances in computing speed and bandwidth.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality content generation system 100 ("system 100") for representing a scene by combining perspective and orthographic projections. As shown, system 100 may include, without limitation, a scene management facility 102, a content generation facility 104, a communication facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. In some examples, each of facilities 102 through 108 may be distributed between multiple devices and/or multiple locations as may serve a particular implementation.

In some examples, facilities 102 through 108 may be configured to operate in real-time so as to generate, manage, access, process, and/or provide data while a user is experiencing a scene associated with a real-time timeline. As used herein, operations may be performed in "real time" when they are performed immediately and without undue delay such that, for example, data processing operations associated with a virtual reality scene based on an ongoing event (e.g., a real-world sporting event, a virtualized gaming event, etc.) are performed while the event is still ongoing (i.e., rather than after the fact) even if there is some amount of delay such as a few seconds or minutes. In some examples, these types of real-time operations may allow virtual reality users to experience a real-world event live or at approximately the same time as people actually attending the event.

Each of facilities 102 through 108 may include or be implemented by one or more physical computing devices including hardware and/or software components such as processors, memories, storage drives, communication interfaces, instructions stored in memory for execution by the processors, and so forth. In some examples, the facilities may be implemented using separate computing components unique to each facility, while, in other examples, the facilities may be implemented using shared computing components. As will be described in more detail below, each of facilities 102 through 108 may be implemented on a server side of a server-client data distribution architecture so as to provide content (e.g., virtual reality content) to client media player devices located on a client side of the data distribution architecture. Each of facilities 102 through 108 will now be described in more detail.

Scene management facility 102 may be configured to perform various operations associated with generating, creating, accessing, maintaining, updating, and/or otherwise managing state data for a virtual reality scene. The state data may be representative of a state of a volumetric representation (e.g., a 3D model, etc.) of the virtual reality scene as the state changes over time. In some examples, the volumetric representation may be a real-time volumetric representation that tracks a real-world scene or virtualized scene as the scene changes in real time. As such, the state of the volumetric representation may represent a current, real-time state that various aspects of the volumetric representation are in (e.g., where objects are located within the scene, how objects are oriented, how objects are moving, etc.). In other examples, the volumetric representation may be associated with a virtual timeline (i.e., a timeline that is unrelated to real time in the real world) and scene management facility 102 may manage the state of the virtual reality scene for each time covered by the virtual timeline (which may be manipulated arbitrarily in ways that real timelines cannot be manipulated). In still other examples, the volumetric representation may be based on both real-world and virtualized elements. For instance, captured color footage of a real-world scene could be projected onto a virtualized 3D depth model of the scene to generate a mixed volumetric representation of a virtual reality scene that is based on the real-world scene.

Content generation facility 104 may be configured to perform various operations associated with generating a scene representation of the virtual reality scene based on state data managed by and received from scene management facility 102. Specifically, content generation facility 104 may use the state data representative of the volumetric representation to generate a scene representation that includes a set of surface data frame sequences each depicting a different projection of the virtual reality scene from a different vantage point. For example, some frame sequences in the set may include color data depicting respective color projections of the virtual reality scene from particular vantage points, while other frame sequences in the set may include depth data depicting respective depth projections of the virtual reality scene from the same or other vantage points. Surface data frame sequences including color and/or depth data will be described in more detail below.

The different projections depicted by the set of surface data frame sequences may include different types of projections (e.g., orthographic projections and perspective projections) to leverage the strengths and weaknesses of the different types of projections as described above. For example, content generation facility 104 may include, within the generated scene representation, surface data frame sequences depicting both a plurality of orthographic projections and a plurality of perspective projections. The plurality of orthographic projections may be generated, for example, based on a plurality of orthographic vantage points representative of a core portion of the virtual reality scene. In some examples, some of the plurality of orthographic vantage points may be directed inwardly toward one another and toward the core portion of the virtual reality scene, or may otherwise be directed so as to uniformly sample the core portion along a rectangular grid. The plurality of perspective projections, on the other hand, may be generated based on a plurality of perspective vantage points representative of a peripheral portion of the virtual reality scene. For example, the peripheral portion may be external to the core portion (e.g., surrounding the core portion on one or more sides). Exemplary orthographic and perspective projections, vantage points, portions of virtual reality scenes, and so forth will all be described and illustrated in more detail below.

Communication facility 106 may be configured to perform various operations associated with communicating data to and from other systems and/or devices included within a configuration in which system 100 operates. For example, communication facility 106 may access and/or receive data from other systems such as a scene capture system that includes capture devices configured to capture color data and/or depth data footage of a real-world scene. Communication facility 106 may also receive data from one or more media player devices to, for example, request that content be provided to the devices, indicate user input that the devices have received, or the like. As another example, communication facility 106 may provide data to other systems on the server side or the client side of a server-client architecture. For example, communication facility 106 may provide the scene representation generated by content generation facility 104 to a client-side media player device by way of a network in any of the ways described herein.

Storage facility 108 may maintain any suitable data received, generated, managed, analyzed, maintained, used, and/or transmitted by facilities 102 through 106 in a particular implementation. For example, storage facility 108 may include state data, projection data (e.g., surface data frame sequences depicting orthographic projections, perspective projections, or any other suitable projections), data representative of boundaries of different reference positions of a virtual reality scene, and so forth. Additionally, storage facility 108 may include program instructions and/or other data used by facilities 102 through 106 in performing the operations described herein.

Figure 2:
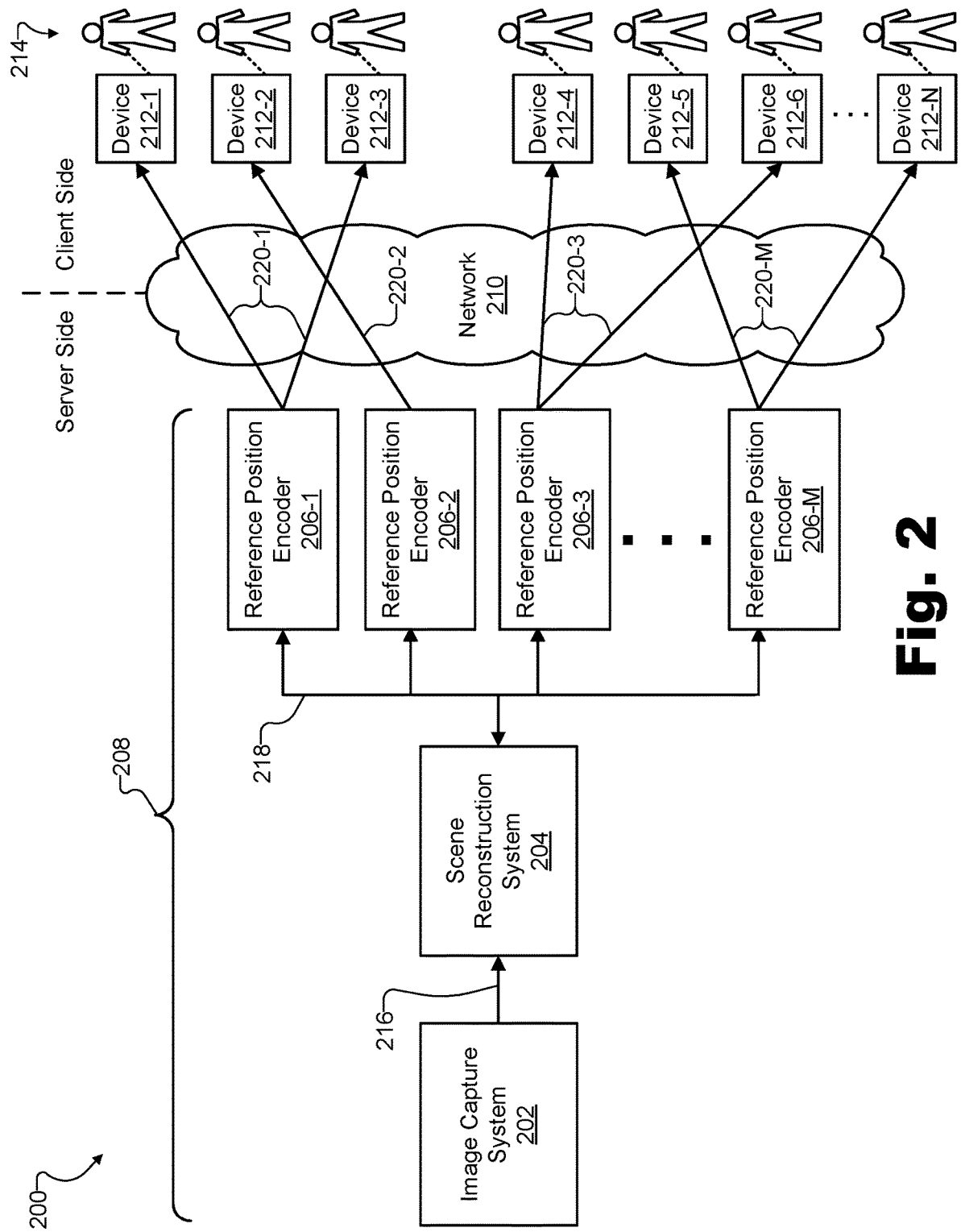
FIG. 2 illustrates an exemplary configuration within which the virtual reality content generation system of FIG. 1 is implemented according to principles described herein.

FIG. 2 illustrates an exemplary configuration 200 within which system 100 may be implemented. Specifically, configuration 200 includes an image capture system 202, a scene reconstruction system 204, and a plurality of reference position encoders 206 (e.g., reference position encoders 206-1 through 206-M). As shown, image capture system 202, scene reconstruction system 204, and reference position encoders 206 may be selectively and communicatively coupled to one another. Collectively, image capture system 202, scene reconstruction system 204, and the plurality of reference position encoders 206 may form an exemplary virtual reality provider system 208. Virtual reality provider system 208 may further be communicatively coupled, by way of a network 210, to a plurality of media player devices 212 (e.g., media player devices 212-1 through 212-N) associated with a plurality of users 214.

As illustrated in FIG. 2, a server-client approach may be employed in configuration 200 for virtual reality data to be generated by and provided from a server side of network 210, and to be received by and consumed on a client side of network 210. On the server side, configuration 200 illustrates a pipeline approach for generating data. Specifically, raw video data is captured by image capture system 202, and then is processed and passed along by scene reconstruction system 204 and reference position encoders 206. In some examples, additional or fewer components may be included in the pipeline than illustrated in configuration 200 and explicitly described herein. It will be understood that each of the components of the pipeline illustrated in configuration 200 may be implemented using computer hardware and software in any suitable manner. For instance, each separate box illustrated in configuration 200 may represent a different computing device or group of devices (e.g., a different server computer or group of servers), a different chip (e.g., processor) within a single physical computing device, a different software thread or process, or the like. Conversely, different elements may be merged and combined in any manner as may serve a particular implementation.

System 100 may be implemented within configuration 200 in any manner as may serve a particular implementation. For example, certain facilities or aspects of system 100 may be implemented by any of the systems included within virtual reality provider system 208 (e.g., image capture system 202, scene reconstruction system 204, one or more of reference position encoders 206, or any other subcomponent of virtual reality provider system 208 not explicitly shown). In some examples, system 100 may be fully implemented by one of these systems, while, in other examples, system 100 may be distributed over a plurality of the systems included within virtual reality provider system 208. Certain aspects of system 100 may by performed, in some examples, by network 210 and/or one or more of media player devices 212. Each of the elements represented in configuration 200 will now be described in more detail.

Image capture system 202 may be configured to capture surface data frames representative of a virtual reality scene. In some examples, image capture system 202 may capture sequences of such surface data frames that will be referred to herein as surface data frame sequences. In certain implementations, a virtual reality scene may be based on a real-world scene (e.g., by being generated based on camera-captured footage of real-world scenery, etc.). As such, image capture system 202 may include or be communicatively coupled with a plurality of capture devices (e.g., video cameras, depth imaging devices, etc.) configured to capture images for processing and distribution by image capture system 202. For instance, an exemplary implementation of image capture system 202 may include a plurality of capture devices that may be selectively and communicatively coupled to one another and to a capture controller included within image capture system 202.

Each capture device included within image capture system 202 may be configured to capture both color data and depth data (collectively referred to herein as "surface data"), or may include separate devices for capturing these different types of data. The capture devices may be disposed at different positions around a real-world scene that includes real-world objects for which the capture devices may be configured to capture representations from respective vantage points of the capture devices. The capture controller may then receive color and depth images captured by the capture devices and may manage (e.g., buffer, aggregate, synchronize, etc.) the images to prepare different surface data frame sequences (e.g., color data frame sequences, depth data frame sequences, etc.) that may be provided to downstream systems in the pipeline such as scene reconstruction system 204.

Image capture system 202 is shown to provide image data 216 to scene reconstruction system 204. For example, image data 216 may include individual images (i.e., color or depth data frames), synchronized sequences of images (i.e., color or depth data frame sequences), audio data, metadata, and/or any other data captured and/or generated by image capture system 202. The role of scene reconstruction system 204 may then be to receive and process image data 216 to generate a plurality of surface data frame sequences that is sent as data 218 to each of reference position encoders 206. Data 218 may be implemented as a full atlas frame sequence from which partial atlas frame sequences may be generated by each reference position encoder 206 (e.g., atlas frame sequences that include different subsets of the frame sequences included in data 218). Alternatively, data 218 may be implemented using another data structure (i.e., other than an atlas structure) that similarly incorporates each of the surface data frame sequences in any manner as may serve a particular implementation.

To this end, scene reconstruction system 204 may include a volumetric representation system, a plurality of 3D rendering engines, a frame packaging system, and/or any other suitable components as may serve a particular implementation. The volumetric representation system may receive image data 216 from image capture system 202, and may be configured to manage a volumetric representation of the real-world scene and objects included therein based on image data 216. In some examples, the volumetric representation managed by the volumetric representation system may be dynamically changing (e.g., due to behavior of the objects included within the volumetric representation, due to interaction by users experiencing a virtual reality scene associated with the volumetric representation, etc.). As such, the volumetric representation system may track the current state of the volumetric representation in light of the dynamic changes and may generate state data representative of the state of the volumetric representation being managed and tracked by the volumetric representation system. For example, the state data may take the form of a plurality of volumetric representation frames (e.g., key frames, update frames, etc.) that may each be provided to each of the 3D rendering engines included within scene reconstruction system 204. In some examples, the state data may include images captured by image capture system 202 and/or links to an asset storage system that is further included within scene reconstruction system 204 for storing images and/or other detailed information (e.g., binary data representative of virtual object geometries, textures, etc.).

Different 3D rendering engines included within scene reconstruction system 204 may be associated with different vantage points with respect to the volumetric representation. Different types of vantage points with which each 3D rendering engine may be associated will be described in more detail below. Each of the 3D rendering engines may be configured to render at least one surface data frame sequence depicting the virtual reality scene from the respective vantage point with which the 3D rendering engine is associated. For example, different 3D rendering engines may generate color data frame sequences from different vantage points, depth data frame sequences from the same or other vantage points, and so forth. Each surface data frame sequence generated by the 3D rendering engines may further include or be associated with metadata and/or other suitable information as may serve a particular implementation.

As used herein, "color data" may broadly include any image data, video data, or the like, whether represented in color or grayscale (i.e., "black and white"), that represents how a subject (e.g., an object included within a virtual reality scene) may appear at a particular point in time or over a particular time period from a particular vantage point. Color data is not limited to any particular format, file type, frame rate, resolution, quality level, or other characteristic that may be associated with various definitions and/or standards defining image data and/or video data in the art. Similarly, as used herein, "depth data" may include any data representative of a position of a point or surface in space. For example, rather than representing a visible appearance of an object, depth data may represent the depth (i.e., the distance or position) of each point on the surface of the object with respect to the vantage point. As with color data, depth data may be captured, formatted, transmitted, and represented in any suitable form. For example, as shown, depth data may be represented using grayscale image data (e.g., using a certain number of bits to represent the depth of each pixel). For each pixel in a depth representation, for instance, a shade of gray may represent how far away the represented pixel is from the vantage point. For example, points that are closer to the vantage point may be represented with values that represent darker shades of gray (e.g., binary values closer to 0b111111 in the case of a six-bit implementation where 0b111111 represents black). Conversely, points that are farther away from the vantage point may be represented with values that represent lighter shades of gray (e.g., binary values closer to 0b000000 in the case of the six-bit implementation where 0b000000 represents white).

As mentioned above, because both color data and depth data represent object surfaces in different ways, color and depth data may be collectively referred to herein as "surface data." Accordingly, a surface data frame or surface data frame sequence may refer to frames or frame sequences that include either color data, depth data, or both.

After being rendered by the 3D rendering engines, surface data frame sequences may be provided to a frame packaging system also included within scene reconstruction system 204 that organizes, synchronizes, combines, and/or otherwise processes the surface data frame sequences to generate data 218. Each reference position encoder 206 then generates, based on the comprehensive plurality of surface data frame sequences included in data 218, respective scene representations 220 (e.g., scene representations 220-1 through 220-M) that each include a different subset of the plurality of surface data frame sequences included in data 218.

Figure 3:
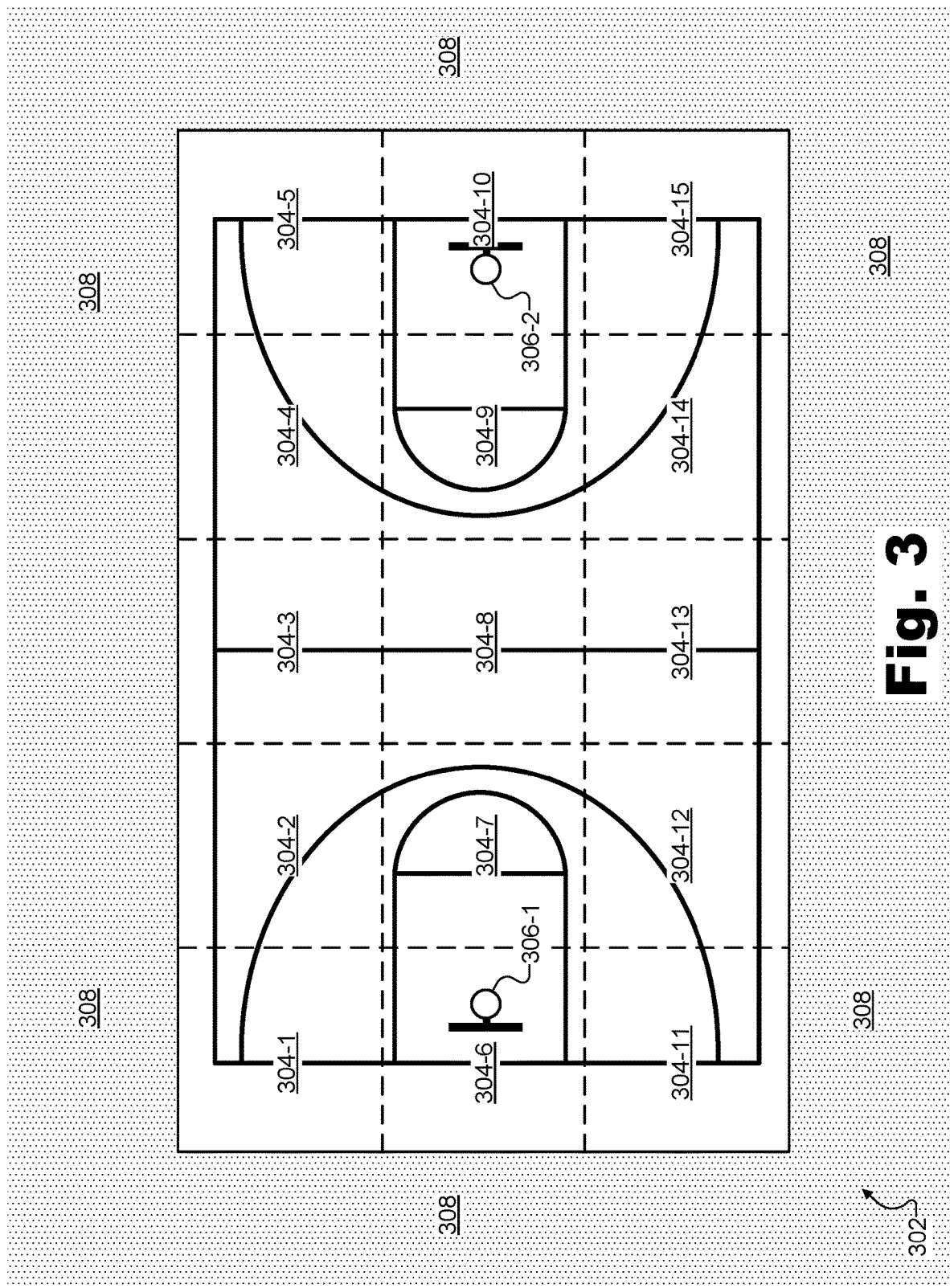
FIG. 3 illustrates an exemplary virtual reality scene according to principles described herein.

For example, referring to an exemplary virtual reality scene 302 illustrated in FIG. 3, each subset of surface data frame sequences generated (e.g., selected, filtered, encoded, etc.) by reference position encoders 206 may correspond to a particular reference position 304 in a plurality of reference positions 304 shown in FIG. 3 (i.e., reference positions 304-1 through 304-15). Specifically, as shown in FIG. 3, virtual reality scene 302 includes a basketball court that may include various objects such as opposing basketball standards 306-1 and 306-2, and various objects not explicitly shown or labeled (e.g., players, referees, and other people on the court; a basketball being used for the game; people and inanimate objects such as tables, chairs, water coolers, and so forth along the sidelines; etc.). It will be understood that the basketball court implementation of FIG. 3 is exemplary only, and that virtual reality scenes such as virtual reality scene 302 may include any type of indoor or outdoor scene as may serve a particular implementation.

As shown, virtual reality scene 302 may include or be divided into various portions including internal portions of the basketball court and surrounding floor (illustrated by dashed lines), as well as external portions surrounding the floor of the basketball court (illustrated by shading) that may include, for example, stadium seating where an audience of a basketball game may sit to watch the game. Each scene representation generated by each reference position encoder 206 may be associated with a different portion of virtual reality scene 302. For example, the boundary of each core portion of virtual reality scene 302 may define a particular reference position 304 such that the respective portion of virtual reality scene 302 corresponding to each reference position 304 may serve as the core portion for a particular scene representation while other portions corresponding to the other reference positions 304, as well as a periphery 308 of virtual reality scene 302, may be included in the peripheral portion for that particular scene representation or may be outside of the total portion of the virtual reality scene represented by a particular scene representation.

In one specific example, for instance, reference position encoder 206-1 may be configured to generate scene representation 220-1 for users 214 associated with media player devices 212-1 and 212-3, both of whom may be experiencing virtual reality scene 302 from respective user positions within a portion of virtual reality scene 302 associated with reference position 304-1. Accordingly, reference position encoder 206-1 may generate scene representation 220-1 to include a plurality of orthographic projections generated based on a plurality of orthographic vantage points positioned at virtual locations defining a boundary of the core portion associated with reference position 304-1. These orthographic vantage points may be directed inwardly toward one another and toward the core portion that, in this example, is associated with reference position 304-1. Scene representation 220-1 may further include a plurality of perspective projections generated based on a plurality of perspective vantage points positioned on or within the boundary of the core portion associated with reference position 304-1. These perspective vantage points may be directed outwardly away from one another and toward a peripheral portion of virtual reality scene 302 that, in this example, may include portions of virtual reality scene 302 associated with periphery 308 and/or any of reference positions 304-2 through 304-15.

As another example, reference position encoder 206-2 may be configured to generate scene representation 220-2 for the user 214 associated with media player device 212-2, who may be experiencing virtual reality scene 302 from a user position within a portion of virtual reality scene 302 associated with reference position 304-2. Accordingly, reference position encoder 206-2 may generate scene representation 220-2 to include a plurality of orthographic projections generated based on a plurality of orthographic vantage points positioned at virtual locations defining a boundary of the core portion associated with reference position 304-2. These orthographic vantage points may be directed inwardly toward one another and toward the core portion that, in this example, is associated with reference position 304-2. Scene representation 220-2 may further include a plurality of perspective projections generated based on a plurality of perspective vantage points positioned on or within the boundary of the core portion associated with reference position 304-2. These perspective vantage points may be directed outwardly away from one another and toward a peripheral portion of virtual reality scene 302 that, in this example, may include portions of virtual reality scene 302 associated with periphery 308 and/or any of reference positions 304-1 and 304-3 through 304-15.

Returning to FIG. 2, each of the scene representations 220 generated by each of reference position encoders 206 may be provided to any number of media player devices 212 that may request that scene representation 220. For example, as shown and as described above, the users 214 associated with media player devices 212-1 and 212-3 may be experiencing virtual reality scene 302 from a portion of the scene corresponding to scene representation 220-1 (i.e., a scene representation corresponding to reference position 304-1), the user 214 associated with media player devices 212-2 may be experiencing virtual reality scene 302 from a portion of the scene corresponding to scene representation 220-2 (e.g., a scene representation corresponding to reference position 304-2), and so forth. It will be understood that, in certain implementations or at certain times, no media player device 212 may happen to be requesting a particular scene representation 220 because no user 214 happens to be experiencing virtual reality scene 302 from the portion associated with that particular scene representation 220. In this case, a particular reference position encoder 206-1 may temporarily cease generating and/or providing its particular scene representation 220 until again requested to do so.

In generating and transmitting scene representations 220, system 100 may employ various different coordinate spaces to represent depth data for virtual reality scene 302. For example, a world coordinate space may be associated with virtual reality scene 302 itself, various camera coordinate spaces may be associated with different vantage points from which different projections of virtual reality scene 302 are generated, and various screen coordinate spaces and/or clip coordinate space may be associated with the projections of virtual reality scene 302 themselves. Various transforms may also be determined and packaged with scene representations 220 (e.g., as metadata) to facilitate conversion of datapoints from one coordinate space to another.

While depth data may be generated and transmitted over network 210 to media player devices 212 using any suitable coordinate space, it may be advantageous for various reasons to represent depth data within a given scene representation 220 using a clip or screen coordinate space for transmission, and to include a transform (e.g., an inverse view-projection transform) with the depth data to allow the depth data to be converted by the media player device 212 from the clip or screen coordinate space back to the world coordinate space as part of the rendering process. For instance, one advantage of using a clip or a screen coordinate space is that these coordinate spaces are not linearized, as is the world coordinate space. As such, the limited amount of data transmitted may be best leveraged by naturally allocating more data for describing regions closer to a particular vantage point and less data for describing regions farther from the vantage points. Additionally, another advantage of using clip coordinate spaces relates to preserving precision in compressed depth data. Accordingly, system 100 may generate and transmit the surface data frame sequences included within scene representation 220 using non-normalized, non-linear coordinates of a coordinate space such as a screen or clip coordinate space rather than using the normalized, linear coordinates of the world coordinate space.

Network 210 may include a provider-specific wired or wireless network (e.g., a cable or satellite carrier network or a mobile telephone network), the Internet, a wide area network, a content delivery network, or any other suitable network. Data may flow between virtual reality provider system 208 on the provider side of configuration 200 (e.g., from reference position encoders 206) to media player devices 212 on the client side of configuration 200 using any communication technologies, devices, media, and protocols as may serve a particular implementation.

Media player devices 212 may be used by users 214 to access and experience virtual reality content generated and provided by virtual reality provider system 208. For example, media player devices 212 may be configured to generate (e.g., based on the surface data frame sequences included within the respective scene representations each media player device 212 receives) a 3D representation of virtual reality scene 302 to be experienced by the respective user 214 from an arbitrary experience location (e.g., a dynamically selectable location selected by the user and corresponding to an arbitrary user position within virtual reality scene 302). To this end, media player devices 212 may be configured to render surface data frame sequences depicting different projections of virtual reality scene 302 from arbitrary vantage points dynamically selected by users 214 in a similar way to how the surface data frame sequences were described above to be rendered by the 3D rendering engines included in scene reconstruction system 204.

As described above, the output of virtual reality provider system 208, and, more particularly, the output of an implementation of system 100 included therein and/or implemented thereby, may include one or more scene representations 220 that each include a respective set of surface data frame sequences depicting orthographic projections and perspective projections of virtual reality scene 302. As mentioned above, orthographic projections, as used herein, refer to renderings or other projections of color data and/or depth data created using parallel projection lines, while perspective projections refer to renderings or other projections employing diverging projection lines.

Accordingly, orthographic projections may contrast with perspective projections in both the manner in which the projections are generated, as well as in the final appearance of the projections. For example, while both types of projections may be generated by raytracing or other suitable techniques, orthographic projections may make use of parallel rays emanating from a planar vantage point referred to herein as an orthographic vantage point, while perspective projections may make use of diverging rays emanating from a planar or point-based vantage point referred to herein as a perspective vantage point. As such, while perspective projections may depict objects as the objects actually appear from a particular point in space (e.g., a virtual point in the virtual reality scene), orthographic projections may depict objects differently than the objects actually appear from any given point in space. To illustrate, exemplary orthographic and parallel projections will now be described.

Figure 4B:
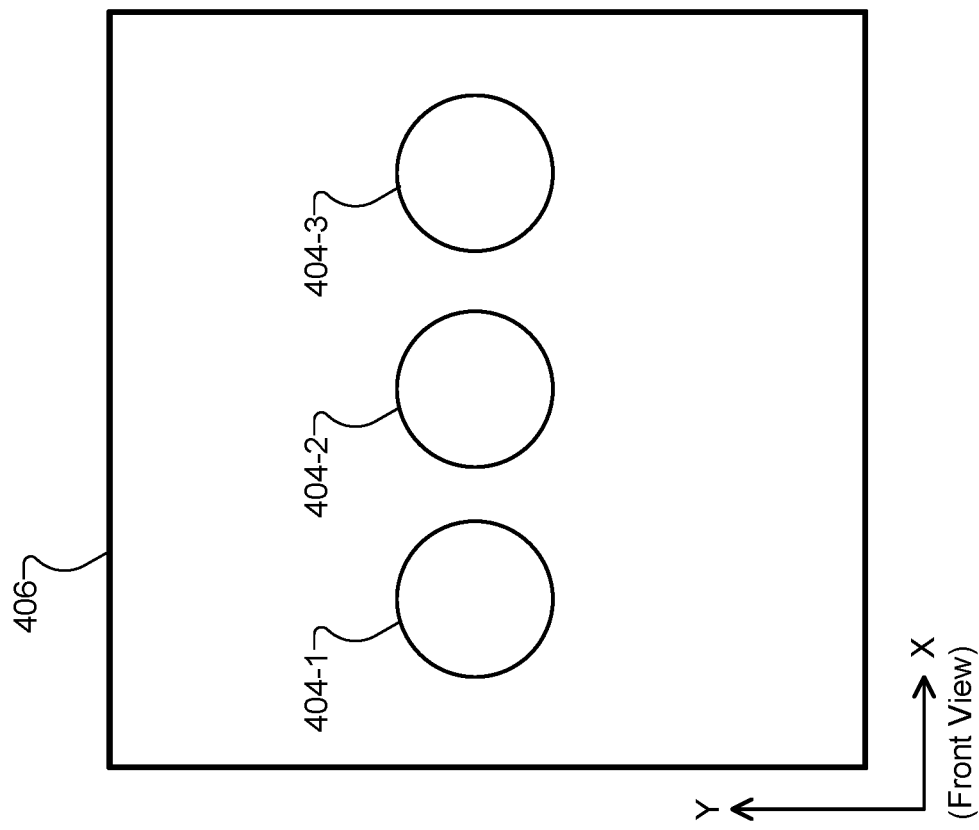
FIG. 4B illustrates an exemplary orthographic projection generated based on the orthographic vantage point of FIG. 4A according to principles described herein.
Figure 4A:
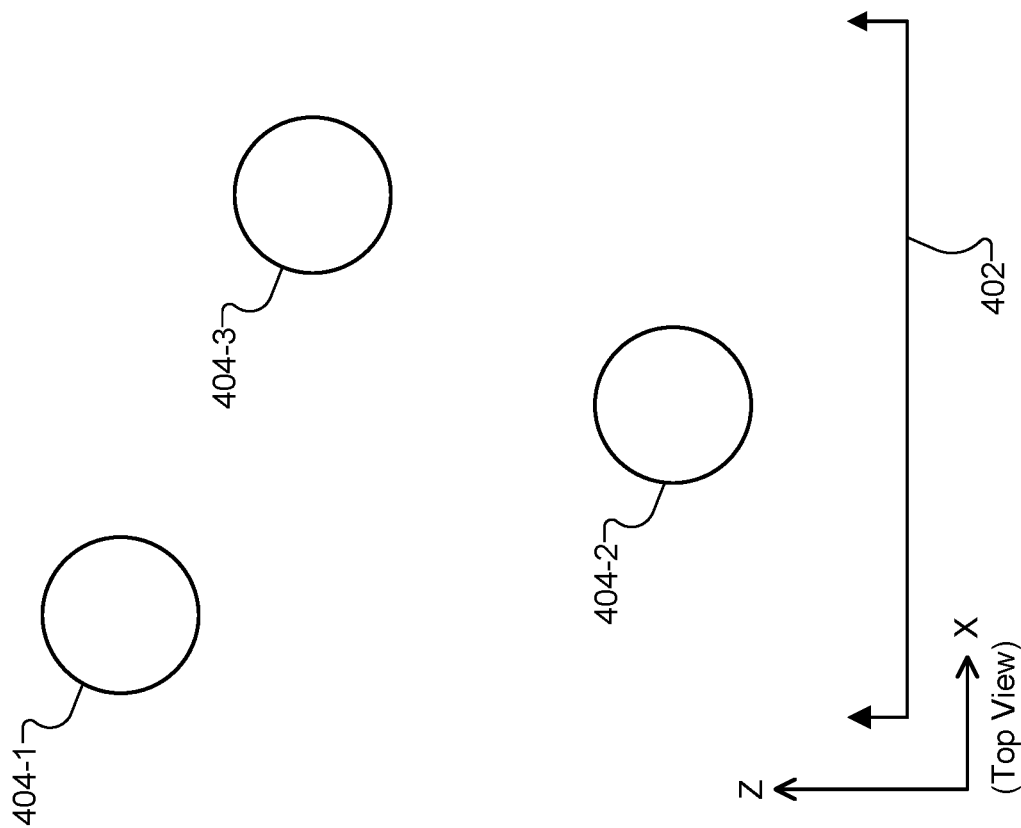
FIG. 4A illustrates an exemplary orthographic vantage point directed toward exemplary objects according to principles described herein.

First, to illustrate an exemplary orthographic projection, FIG. 4A shows an exemplary orthographic vantage point 402 directed toward exemplary objects 404 (i.e., objects 404-1 through 404-3). As indicated by a coordinate system drawn in the corner of FIG. 4A, orthographic vantage point 402 and objects 404 are depicted from a top view in FIG. 4A, where an x-axis extends to the right across the page, a z-axis extends upward toward the top of the page, and a y-axis (not explicitly shown in FIG. 4A) will be understood to extend out of the page. As such, the coordinate system shown in FIG. 4A, and which will be carried through to other illustrations herein, will be understood to be a "left-handed" coordinate system.

Objects 404 are shown as circles in the 2D depiction of FIG. 4A, but will be understood to be spherical and coplanar with one another on a plane parallel to the x-z plane. For clarity of description, objects 404 will be understood to be identical (i.e., spheres of identical size).

In FIG. 4A, orthographic vantage point 402 is symbolized by a relatively long line perpendicular to the z-axis and including parallel arrow tips at either end in the direction of the positive z-axis. While only two dimensions are clearly illustrated in FIG. 4A, it will be understood that orthographic vantage point 402 may actually be implemented as a 3D vantage point (e.g., a cubic orthographic vantage point) parallel to the x-y plane and directed in the positive z direction toward objects 404. As such, an orthographic projection that depicts objects 404 may be generated based on orthographic vantage point 402.

To illustrate, FIG. 4B shows such a projection. Specifically, FIG. 4B illustrates an exemplary orthographic projection 406 that is generated based on orthographic vantage point 402 to depict each of objects 404. As indicated by the coordinate system in FIG. 4B, orthographic projection 406 depicts objects 404 from a front view where the x-axis still extends to the right across the page, but now the y-axis extends upward toward the top of the page and the z-axis (not explicitly shown in FIG. 4B) will be understood to extend into the page.

As shown in FIG. 4B, each of objects 404 is depicted to have a same size in orthographic projection 406, despite the fact that, as shown in FIG. 4A, each object 404 is actually a different distance from orthographic vantage point 402. This is because, as described above, each ray used to generate each pixel of orthographic projection 406 may be parallel to one another and may emanate from a planar area of orthographic vantage point 402, which may be the same size as orthographic projection 406. Accordingly, in orthographic projection 406, each object 404 may be depicted with an equal amount of detail and resolution, rather than being downsampled so as to depict relatively close objects to the vantage point (e.g., object 404-2) with greater size and detail than relatively distant objects from the vantage point (e.g., object 404-1).

As described above, it may be advantageous to represent objects in this way (i.e., without natural downsampling) when each object is close enough to a user position in a virtual reality scene that the objects may all be observed in detail, explored from different angles, and so forth. For example, it may be desirable to represent objects included within a particular reference position 304 using orthographic projections when a user position of a user observing the objects is also located within that reference position 304.

To illustrate, FIG. 5 shows a particular reference position 304 depicted as a square formed by dashed line segments and understood to represent any of reference positions 304-1 through 305-15 in FIG. 3 and to be surrounded by other reference positions 304 and/or periphery 308, neither of which are explicitly shown in FIG. 5. Reference position 304 is illustrated to be a 2D square from the top view used in FIG. 5, but will be understood to also extend out of the page in the direction of the positive y-axis to form a cube.

As such, the boundary of reference position 304 may also define (i.e., act as a boundary for) a core portion of virtual reality scene 302 that may be associated with orthographic and perspective vantage points in any of the ways described herein. Additionally, it will be understood that cubic reference positions, core portions, peripheral portions (described in more detail below) and other cubes described and illustrated herein may, in certain implementations, be implemented using other geometric shapes such as rectangular prisms, pentagonal prisms, triangular prisms, pyramids, or the like, as may serve a particular implementation.

As shown, FIG. 5 depicts an exemplary plurality of orthographic vantage points 502 (i.e., orthographic vantage points 502-1 through 502-4) positioned at virtual locations defining the boundary of the cubic core portion defined by reference position 304 (or positioned slightly outside the boundaries in order that the illustration is clear). Each orthographic vantage point 502 is shown to be included in a pair of orthographic vantage points 502 that are directed inwardly towards another and toward the core portion of the virtual reality scene defined by this particular reference position 304. Specifically, the pair of orthographic vantage points 502 including orthographic vantage points 502-1 and 502-3 are both parallel to the y-z plane and are directed inwardly toward one another, the pair of orthographic vantage points 502 including orthographic vantage points 502-2 and 502-4 are both parallel to the x-y plane and are directed inwardly toward one another, and an additional pair of orthographic vantage points 502 not explicitly shown in FIG. 5 are both parallel to the x-z plane (i.e., parallel to the page) and are directed inwardly toward one another (i.e., one directed into the page and the other directed out of the page). As such, a plurality of orthographic projections generated based on orthographic vantage points 502 may include pairs of orthographic projections associated with different orthogonal spatial dimensions (e.g., the x, y, and z spatial dimensions illustrated by the coordinate system) by being depicted from the respective pairs of orthographic vantage points 502 shown in FIG. 5 to be directed inwardly along the different orthogonal spatial dimensions.

Additionally, along with orthographic vantage points 502, various other orthographic vantage points 504 are also included within the core portion of virtual reality scene 302 associated with reference position 304. These orthographic vantage points may be optionally added to provide additional vantage points from which objects in the vicinity of reference position 304 may be depicted to provide additional detail to complement or add to that generated by orthographic vantage points 502. In some examples, orthographic projections based on orthographic vantage points 504 (e.g., either those orthographic vantage points 504 shown or other similar orthographic vantage points included within reference position 304) may be generated and transmitted in an intermittent fashion (e.g., turned on and off) so as to be included within a scene representation only, for example, when system 100 determines that such projections would be useful to add to the scene representation based on ongoing events occurring within virtual reality scene 302 or the like. Just as system 100 may add and/or remove orthographic vantage points 504 and their respective orthographic projections in this way, system 100 may further add and/or remove special perspective vantage points within reference position 304 as system 100 may deem to be appropriate (e.g., by intermittently generating a perspective projection based on a perspective vantage point that tracks a particular object within virtual reality scene 302 such as the basketball or a particular player).

Figure 6B:
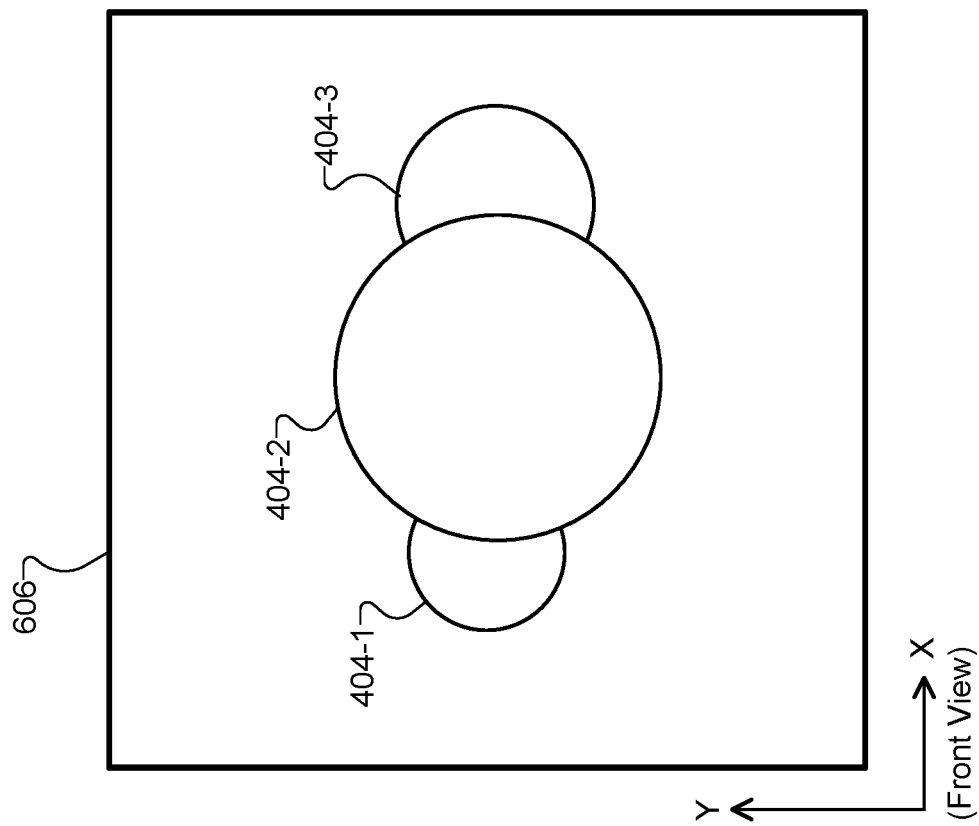
FIG. 6B illustrates an exemplary perspective projection generated based on the perspective vantage point of FIG. 6A according to principles described herein.
Figure 6A:
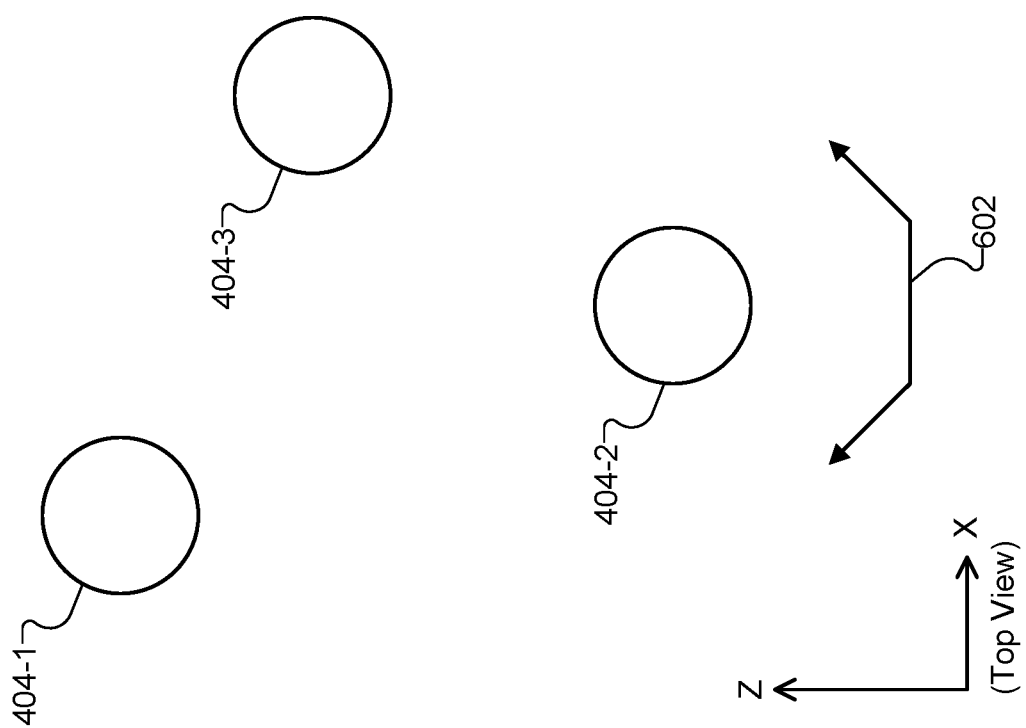
FIG. 6A illustrates an exemplary perspective vantage point directed toward exemplary objects according to principles described herein.

To illustrate an exemplary perspective projection, FIG. 6A shows an exemplary perspective vantage point 602 directed toward the same objects 404 (i.e., objects 404-1 through 404-3) illustrated above in FIG. 4A. As with orthographic vantage point 402 and as again indicated by the coordinate system, perspective vantage point 602 and objects 404 are depicted from a top view.

In FIG. 6A, perspective vantage point 602 is symbolized by a relatively short line perpendicular to the z-axis and including arrow tips at either end diverging away from the z-axis in the positive z direction. While only two dimensions are clearly illustrated in FIG. 6A, it will be understood that perspective vantage point 602 may actually be implemented as a 3D vantage point (e.g., a frustum-shaped perspective vantage point) extending from the x-y plane and directed in the positive z-axis direction toward objects 404. In some examples, rather than diverging from a plane to form a frustum shape, implementations of perspective vantage point 602 may diverge from a point to form a pyramid shape. Regardless of the shape of perspective vantage point 602, a perspective projection that depicts objects 404 may be generated based on perspective vantage point 602.

To illustrate, FIG. 6B shows such a projection. Specifically, FIG. 6B illustrates an exemplary perspective projection 606 that is generated based on perspective vantage point 602 to depict each of objects 404. As with FIG. 4B and as indicated by the coordinate system in FIG. 6B, perspective projection 606 depicts objects 404 from a front view where the x-axis still extends to the right across the page, but now the y-axis extends upward toward the top of the page and the z-axis (not explicitly shown in FIG. 6B) will be understood to extend into the page.

As shown in FIG. 6B, objects 404 are depicted to be of different sizes in perspective projection 606, despite the fact that, as shown in FIG. 6A, each object 404 is actually identically sized. This is because, as described above, each ray used to generate each pixel of perspective projection 606 may be diverging from a common point (in a pyramidal implementation) or from a small planar area (in a frustum-shaped implementation as shown). Accordingly, in perspective projection 606, each object 404 may be depicted with a unique, different amount of detail and resolution, based on the proximity of each object to perspective vantage point 602. Specifically, as shown, perspective projection 606 depicts relatively close objects to the vantage point such as object 404-2 with greater size and detail than relatively distant objects from the vantage point such as object 404-1. As mentioned above, this phenomenon may be referred to as natural downsampling because objects that are further away automatically are represented with less data and objects that are closer automatically are represented with more data by the nature of the perspective vantage point used to generate perspective projection 606. Indeed, from the perspective of perspective vantage point 602, object 404-2 is close enough and large enough that its edges occlude parts of objects 404-1 and 404-3 such that these parts do not need to be represented with any data at all within perspective projection 606.

As described above, it may be advantageous to represent objects in this way (i.e., with natural downsampling) when the objects are far enough away to a user position in a virtual reality scene that the objects are seen as relatively distant background objects and are not close enough for the user to observe them in detail, explore them from different angles, and so forth. For example, it may be desirable to represent objects external to a particular reference position 304 using perspective projections when a user position of a user observing the objects is located within that particular reference position 304.

To illustrate, FIG. 7 shows a particular reference position 304 depicted as a square formed by dashed line segments and understood to represent the same reference position depicted in FIG. 5 (which, as mentioned above, may be any of reference positions 304-1 through 305-15 in FIG. 3). As described above, reference position 304 may be a cube that is viewed from a top view and, as such, the boundary of reference position 304 may define a boundary of a cubic (or other suitably shaped) core portion of virtual reality scene 302 that may be associated with orthographic and perspective vantage points in any of the ways described herein.

As shown, FIG. 7 depicts an exemplary plurality of perspective vantage points 702 (i.e., perspective vantage points 702-1 through 702-4) positioned on the boundary of the cubic core portion defined by reference position 304. While perspective vantage points 702 are illustrated to be slightly offset from the dashed line representing the boundary (i.e., slightly external to the boundary) for clarity of illustration, it will be understood that perspective vantage points 702 may be right on top of the boundary in certain implementations, or may be within the boundary in other implementations (i.e., so as to overlap with the core portion covered by inwardly-directed orthographic vantage points). For example, as shown by the solid lines depicting perspective vantage points 70s, each perspective projection generated based on perspective vantage points 702 may depict a volume of virtual reality scene 302 that forms the shape of a frustum. However, as shown by dotted lines 704, one or more of perspective vantage points 702 may, in certain examples, be extended to a center point 706 at the center of the core portion defined by reference position 304 so as to result in perspective projections that form the shape of a pyramid, where the tip of the pyramid overlaps with the core portion that may also be depicted within orthographic projections based on orthographic vantage points such as orthographic vantage points 502.

In the example in which perspective vantage points 702 begin at the boundary of the core portion (i.e., such that perspective vantage points 702 are frustum shaped), an overall volume depicted by a combination of each volume of each perspective projection 702 may form a hollow cube that includes a cavity within which the cube defined by the boundary is located. More specifically, a peripheral portion of virtual reality scene 302 that is immediately external to the core portion of virtual reality scene 302 and is bounded by a boundary 708 may form a hollow cube (or other suitable shape) within which the cubic core portion (or other suitably-shaped core portion) is included.

It will be understood that object surfaces included within boundary 708 may be represented using color and depth data so as to allow a rendering by a media player device to present these surfaces in a realistic way to be experienced by a user. Distant surfaces visible outside of boundary 708 may also be presented in the perspective projections included within a scene representation, but may not be modeled or represented using a full surface data representation like closer surfaces are. Instead, 2D color representations of distant surfaces may be projected onto the far end of the frustum or pyramid-shaped perspective projections (i.e., along boundary 708) using conventional sky box techniques or the like.

Each perspective vantage point 702 is shown to be included in a pair of perspective vantage points 702 that are directed outwardly away from one another and toward a peripheral portion encompassed within boundary 708. Specifically, the pair of perspective vantage points 702 including perspective vantage points 702-1 and 702-3 are both parallel to the y-z plane and are directed outwardly away from one another, the pair of perspective vantage points 702 including perspective vantage points 702-2 and 702-4 are both parallel to the x-y plane and are directed outwardly away from one another, and an additional pair of perspective vantage points 702 not explicitly shown in FIG. 7 are both parallel to the x-z plane and are directed outwardly away from one another (i.e., one directed into the page and the other directed out of the page). As such, a plurality of perspective projections generated based on perspective vantage points 702 may include pairs of perspective projections associated with the different orthogonal spatial dimensions x, y, and z by being depicted from the respective pairs of perspective vantage points 702 shown in FIG. 7 to be directed outwardly inwardly along the different orthogonal spatial dimensions.

Figure 8:
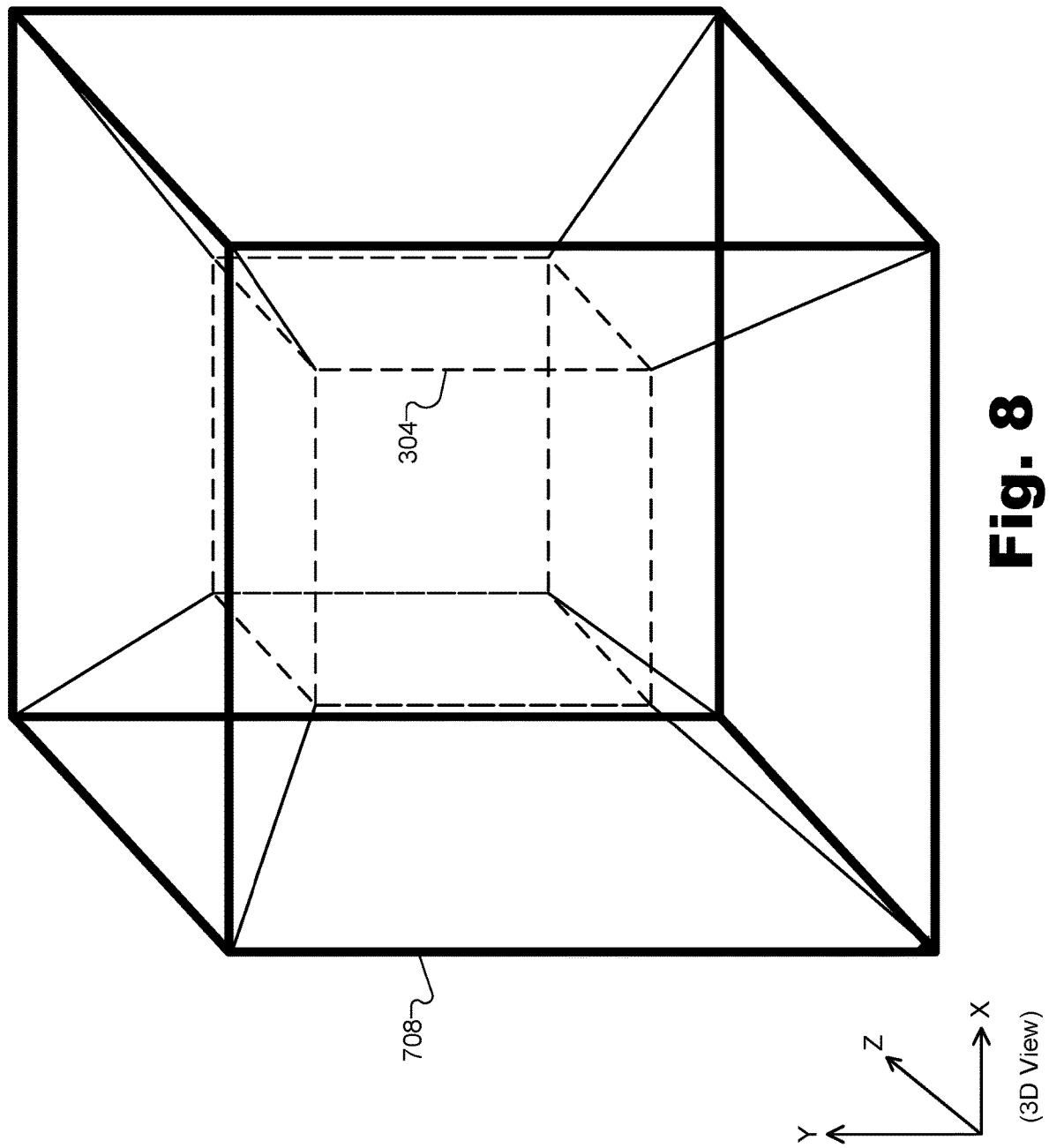
FIG. 8 illustrates a three-dimensional view of the exemplary core portion of FIG. 5 together with the exemplary peripheral portion of FIG. 7 according to principles described herein.

To more fully illustrate an exemplary interplay between a core portion and a peripheral portion of a particular scene representation, FIG. 8 shows a 3D view of the exemplary core portion of FIGS. 5 and 7 (illustrated using dashed line segments associated with reference position 304) together with the exemplary peripheral portion of FIG. 7 (illustrated using a bold, thick line segments defining cubic boundary 708). Specifically, as indicated by the coordinate system shown in the corner of FIG. 8, each of the three orthogonal spatial dimensions x, y, and z are depicted in the 3D view of FIG. 8, in contrast with the two spatial dimensions depicted in each of the illustrations above taken from the top view or the front view.

As shown, the combination of the core portion and the peripheral portion of virtual reality scene 302 (i.e., the core portion defined by the inwardly-directed orthographic vantage points and the peripheral portion defined by the outwardly-directed perspective vantage points) may be depicted to have an appearance of a tesseract, in that an inner cube is connected, on each of its six faces, with respective, equally-sized frusta that, in combination, form a larger outer cube. It will be understood that everything within the volume illustrated in FIG. 8 may be depicted by a particular scene representation (e.g., one of scene representations 220). In particular, the volume included within the inner cube may be depicted by a plurality (e.g., six or more) of orthographic projections such as orthographic projections 502, while the volume outside of the inner cube (but still within the hollow outer cube) may be depicted by a plurality (e.g., six or more) of perspective projections such as perspective projections 702.

Various different projections (e.g., orthographic projections and perspective projections) and specific combinations thereof (e.g., pluralities of projections specifically configured to depict core portions and peripheral portions associated with different reference positions within a virtual reality scene) have now been described. In particular, these projections have been described as being depicted within different surface data frame sequences included in a set of surface data frame sequences that is included within a scene representation such as one of scene representations 220. Once the surface data frame sequences have been generated, or, in some examples, as the surface data frame sequence are being generated, the surface data frame sequences may be packaged together into a scene representation along with any other suitable data (e.g., metadata, audio data, etc.) and using any suitable formats, technologies, etc., as may serve a particular implementation.

Figure 9:
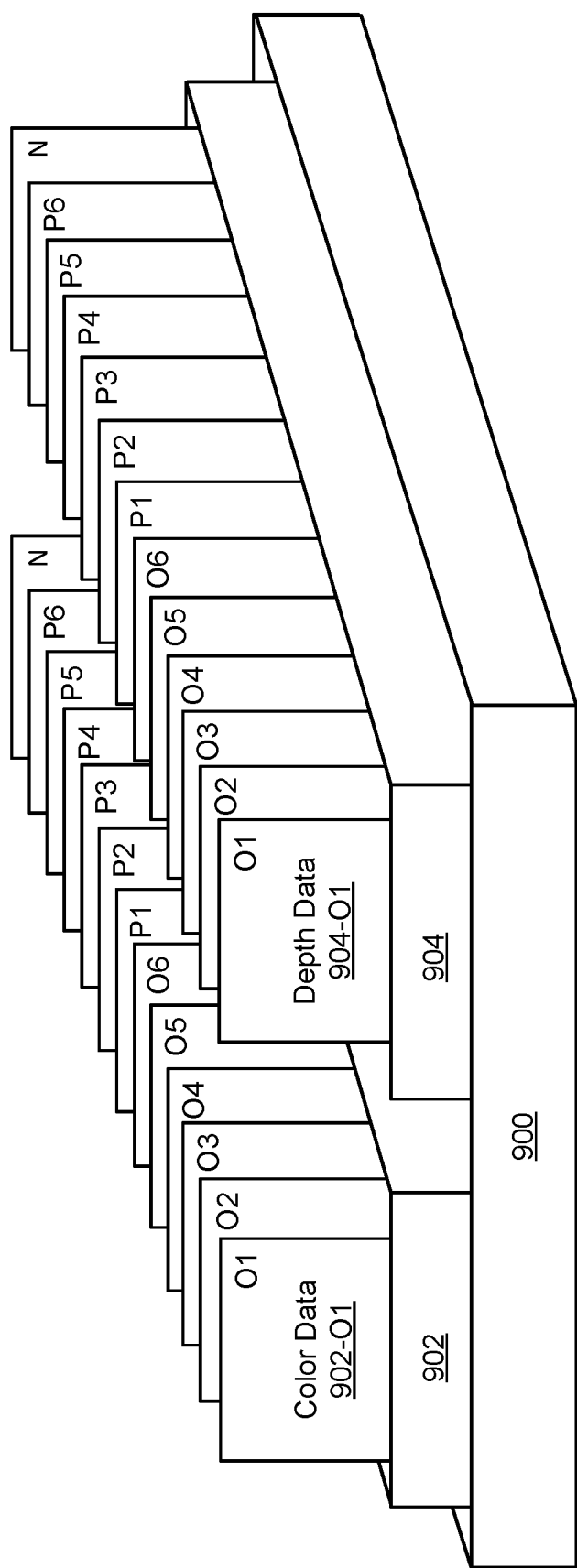

To illustrate, FIGS. 9 and 10 show different exemplary data structures for transporting a scene representation including a set of surface data frame sequences. Specifically, FIG. 9 depicts a representation of a transport stream data structure used to transport the scene representation, while FIG. 10 depicts an atlas frame sequence data structure used to transport the scene representation.

As shown in FIG. 9, an exemplary transport stream 900 includes a plurality of surface data frame sequences 902 and 904. More particularly, the surface data frame sequences include a plurality of color data frame sequences 902 and a plurality of depth data frame sequences 904 that are all included as separate image sequence files (e.g., video files) packaged together within transport stream 900. While each surface data frame sequence 902 and 904 is illustrated as a square, it will be understood that these each represent not a single frame, but a sequence of frames (e.g., a sequence of color frames or a sequence of depth frames). An indicator is shown in the corner of each surface data frame sequence 902 and 904 to indicate a type of projection depicted by the surface data frame sequence and an identification number to differentiate projections of the same type. Specifically, as shown, color data frame sequence 902-01 includes an "01" in the corner to indicate that it depicts an orthographic ("O") projection having an identification ("1") different from other orthographic projections depicted by other color data frame sequences 902.

While other color data frame sequences 902 besides color data frame sequence 902-01 are not explicitly labeled as such in FIG. 9, these sequences may be referred to by their respective indicators in a similar manner as color data frame sequence 902-01. For example, if color data frame sequence 902-01 depicts the color data orthographic projection generated based on orthographic vantage point 502-1, then color data frame sequence 902-02 may depict the color data orthographic projection generated based on orthographic vantage point 502-2, color data frame sequence 902-03 may depict the color data orthographic projection generated based on orthographic vantage point 502-3, and so forth. Moreover, indicators including a "P" may denote surface data frame sequences that depict perspective projections. For instance, color data frame sequence 902-P1 may depict the color data perspective projection generated based on perspective vantage point 702-1, color data frame sequence 902-P2 may depict the color data perspective projection generated based on perspective vantage point 702-2, and so forth. As mentioned above, additional perspective and/or orthographic projections may also be generated to depict other portions of the virtual reality scene besides those structured right around the boundaries of respective reference positions (e.g., such as orthographic projections based on orthographic vantage points 504). Color data frame sequence 902-N may represent one or more of these additional color projections.

Depth data frame sequences 904 are labeled in a similar manner to color data frame sequences 902. Specifically, depth data frame sequence 904-01 may depict the depth data projection from orthographic vantage point 502-1, depth data frame sequence 904-02 may depict the depth data projection from orthographic vantage point 502-2, depth data frame sequence 904-P1 may depict the depth data projection from perspective vantage point 702-1, depth data frame sequence 904-P2 may depict the depth data projection from perspective vantage point 702-2, depth data frame sequence 904-N may depict one or more additional depth data projections from other perspective or orthographic vantage points, and so forth.

In some examples, rather than packaging individual surface data frame sequences into a transport stream or other such data structure, it may be convenient or advantageous to combine (e.g., package, pack, etc.) corresponding frames from each surface data frame sequence onto a single larger frame (referred to herein as an "atlas frame"). By doing this for each corresponding frame (i.e., each frame from each surface data frame sequence that is associated with a same moment in time), a sequence of atlas frames may be generated that may be treated as a single frame sequence (e.g., a single large video file), which may simplify the transport and processing of the surface data frame sequences in various respects. This frame sequence may be referred to herein as an "atlas frame sequence," and the generating of a scene representation of a virtual reality scene, as described herein, may be performed in some examples by generating an atlas frame sequence that includes a plurality of different views of the virtual reality scene (e.g., where each different view includes a different projection of the virtual reality scene depicted by a different surface data frame sequence) combined and packed together onto the atlas frame sequence.

To illustrate, FIG. 10 shows an atlas frame sequence 1000 onto which various surface data frame sequences have been combined. Specifically, as shown, each of color data frame sequences 902-01 through 902-06 and 902-P1 through 902-P6, as well as depth data frame sequences 904-01 through 904-06 and 904-P1 through 904-P6 are included on atlas frame sequence 1000 in a 5×5 grid of frames. Additionally, other data 1004 shown to be included on atlas frame sequence 1000 may represent one or more additional surface data frame sequences (e.g., color data frame sequence 902-N, depth data frame sequence 904-N), metadata associated with surface data frame sequences 902 and/or 904, or the like.

At any particular point in time, different users 214 may experience a virtual reality scene such as virtual reality scene 302 from different user positions within virtual reality scene 302. Accordingly, different scene representations 220 corresponding to different reference positions 304 within virtual reality scene 302 may be provided to different media player devices 212 associated with the different users 214, as described and illustrated above. For example, a user 214 experiencing virtual reality scene 302 from a user position included within the area of reference position 304-1 may be provided with a different scene representation 220 of virtual reality scene 302 than a user 214 experiencing virtual reality scene 302 from a user position included within the area of reference position 304-15.

Additionally, as users 214 experience the virtual reality scene, the users may freely move from one arbitrary user position to another, including, in some cases, moving between different reference positions 304. When users 214 move around in this way, different scene representations 220 associated with different reference positions 304 may be provided to the media player devices 212 associated with the users in accordance with their present user positions. For example, when a user moves between user positions included in a same reference position 304, some or all of the orthographic projections and perspective projections included in one scene representation provided to the user may continue to be provided. However, when the user moves between user positions included in different reference positions 304, some or all of the orthographic projections may continue to be provided in a new scene representation, while different perspective projections may be provided in place of the previous perspective projections.

Specifically, for example, along with generating the initial scene representation, system 100 may be further configured to generate (e.g., based on the same state data) an additional scene representation of the virtual reality scene. The additional scene representation may be generated to correspond to an additional reference position included in the plurality of reference positions by including an additional set of surface data frame sequences depicting additional projections. The additional projections depicted in the additional set of surface data frame sequences may include, for example, an additional plurality of orthographic projections including at least one orthographic projection included in the original plurality of orthographic projections, and an additional plurality of perspective projections that does not include any perspective projection included in the original plurality of perspective projections.

Figure 11:
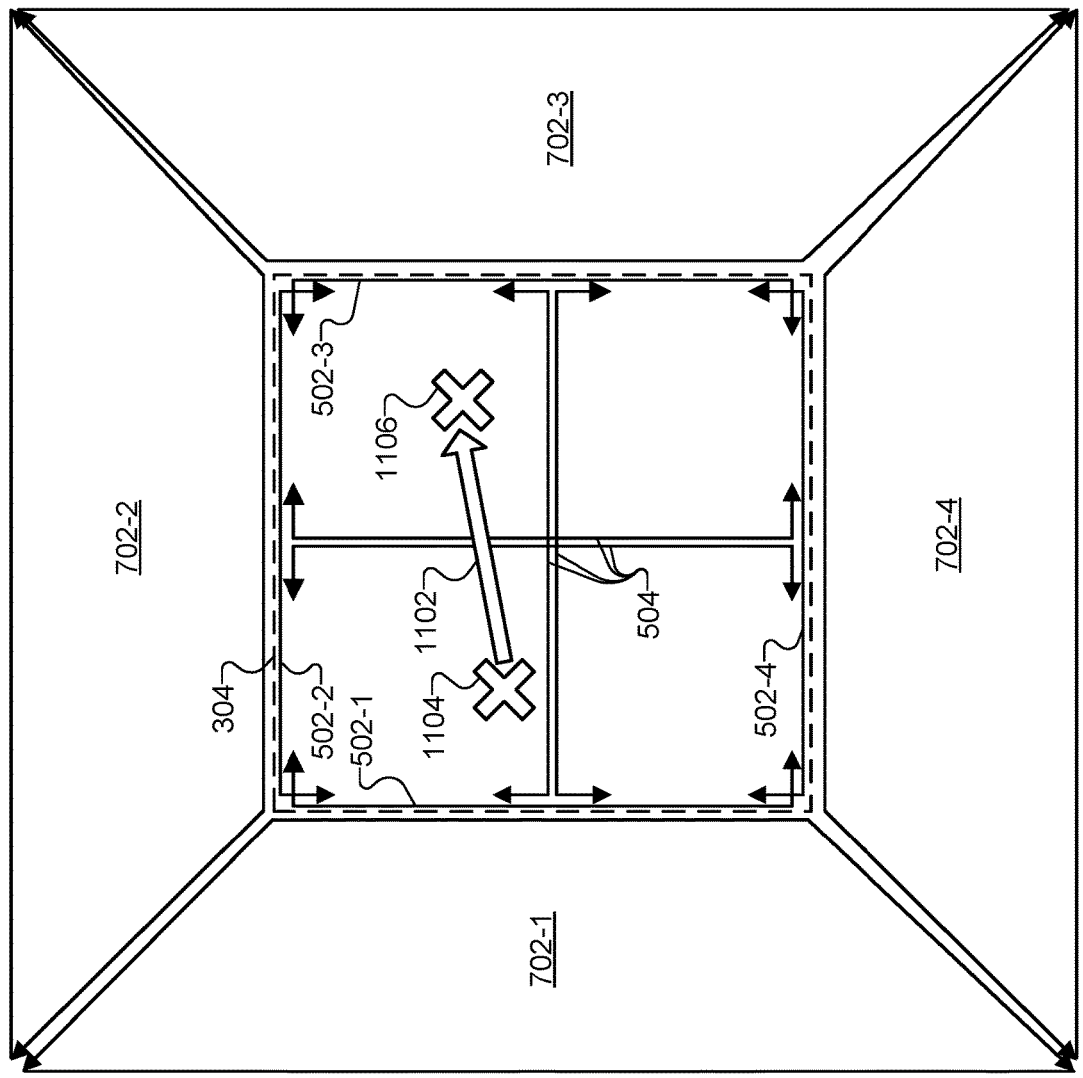
FIGS. 11 and 12 illustrate exemplary user movements from one user position within the virtual reality scene of FIG. 3 to a different user position within the virtual reality scene of FIG. 3 according to principles described herein.
Figure 12:
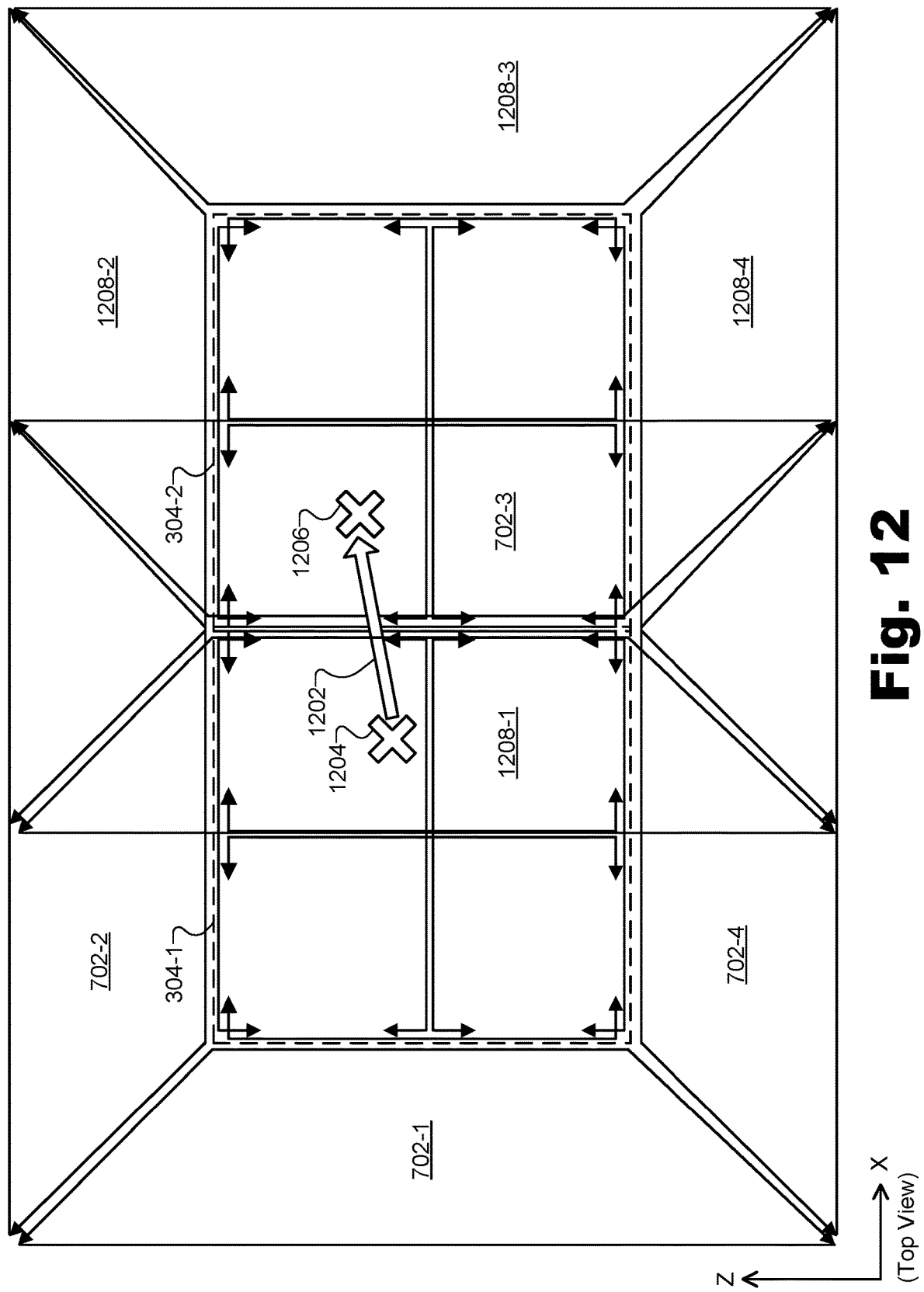

To illustrate, FIGS. 11 and 12 illustrate exemplary user movements from one user position within virtual reality scene 302 to a different user position within virtual reality scene 302.

Specifically, as shown, FIG. 11 depicts a movement 1102 from a first user position 1104 to a second user position 1106. In FIG. 11, movement 1102 is contained within a single reference position 304. As such, some or all of the same orthographic projections (e.g., orthographic projections based on orthographic vantage points 502 and/or 504) may be included in a scene representation provided to the user at user position 1106 as were provided for user position 1104 (before the user performed movement 1102). In certain examples, the scene representation provided for both user positions may be the same scene representation, while in other examples, the scene representation may be changed (e.g., to include different internal orthographic projections based on different orthographic vantage points 504 or the like). However, in any of these examples, the same perspective projections (i.e., the perspective projections generated based on perspective vantage points 702) may be included within the scene representation provided to the user for both user positions 1104 and 1106.

In contrast, FIG. 12 depicts a movement 1202 from a first user position 1204 to a second user position 1206. In FIG. 12, movement 1202 is not contained within a single reference position 304, but extends from user position 1204 in a first reference position 304-1 to user position 1206 in a second reference position 304-2. As such, while certain of the same orthographic projections may be included in a scene representation provided to the user at user position 1206 as were provided for user position 1204 (before the user performed movement 1202), different perspective projections may be provided. Specifically, as shown, while perspective projection generated based on perspective vantage points 702 may be provided for user position 1204, different perspective vantage points 1208 (i.e., perspective vantage points 1208-1 through 1208-4) may be provided for user position 1206, after movement 1202 into reference position 304-2 is performed.

Certain details for implementing a virtual reality content generation system for representing a scene by combining perspective and orthographic projections (e.g., such as system 100) will now be described.

For instance, implementations of system 100 described up to this point have generally been described as being configured to generate scene representations that use orthographic projections to depict a core portion of a virtual reality scene, and that use perspective projections to depict a peripheral portion of the virtual reality scene that surrounds the core portion on all sides (e.g., by including a plurality of frustum-shaped perspective projections that together form a hollow cube that encompasses the cubic core portion). However, in certain implementations, it may be unnecessary and/or inefficient to surround a core portion on every side by perspective projections. For example, if the core portion of a virtual reality scene is situated on the ground (i.e., so as to border a ground plane of the virtual reality scene), it may be useful to include outwardly-directed perspective projections directed along the ground and upwards, but it may be wasteful to generate and provide a perspective projection directed downward at the ground because there are no objects (other than the ground) to represent in that direction. In other words, it may be desirable for the peripheral portion of the virtual reality scene external to the core portion to surround the core portion on every side of the core portion except a ground side of the core portion that borders the ground plane.

Accordingly, in such implementations, system 100 may generate the scene representation by 1) generating the plurality of perspective projections based on perspective vantage points that are directed outwardly away from one another along a ground plane and based on a perspective vantage point that is directed upward away from the ground plane, and 2) abstaining from generating any perspective projection based on a perspective vantage point that is directed downward toward the ground plane.

Figure 13:
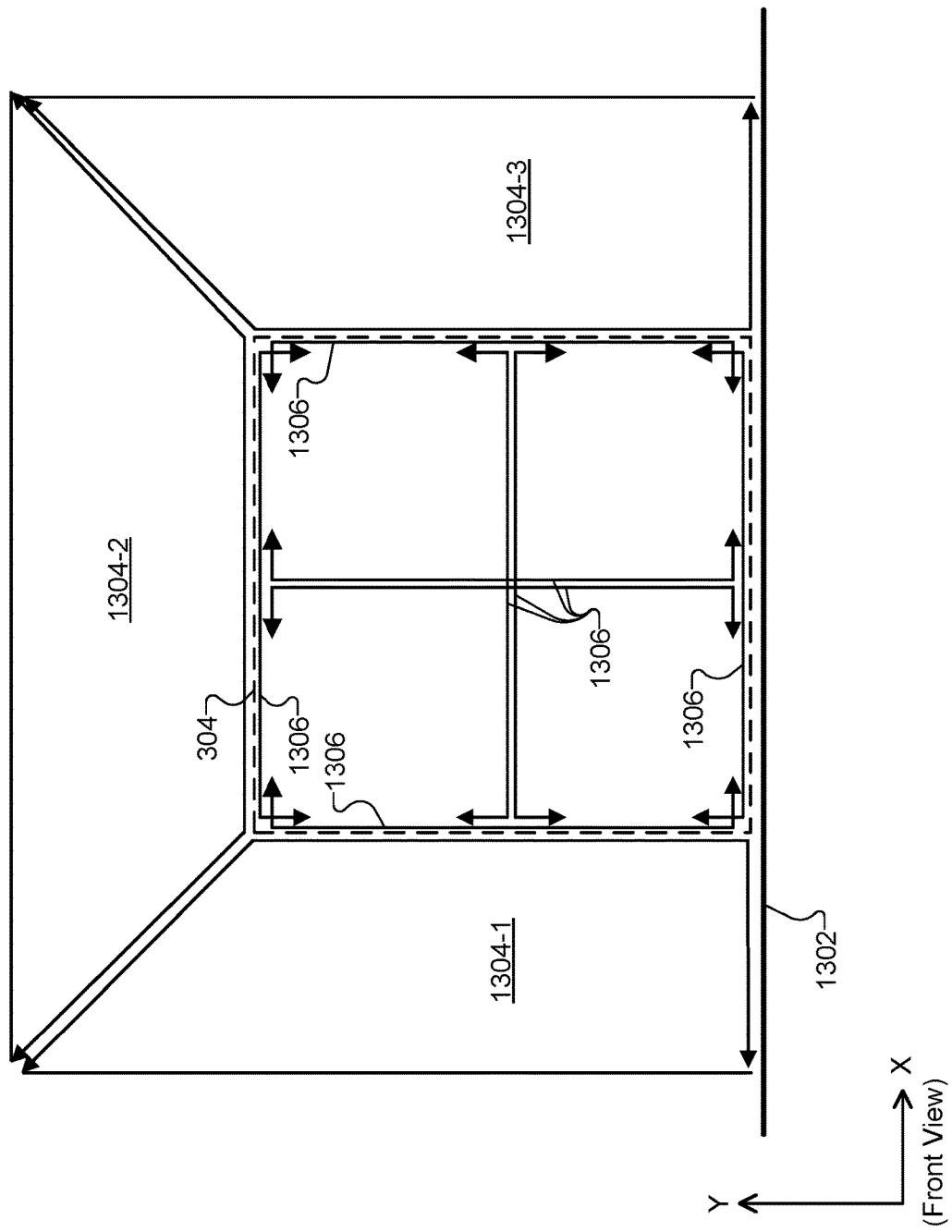
FIG. 13 illustrates exemplary perspective vantage points that are directed outwardly away from one another along a ground plane and a perspective vantage point that is directed upward away from the ground plane according to principles described herein.

To illustrate, FIG. 13 illustrates exemplary perspective vantage points that are directed outwardly away from one another along a ground plane and a perspective vantage point that is directed upward away from the ground plane. Specifically, as shown in the front view depicted in FIG. 13, a core portion of the virtual reality scene defined by a reference position 304 (e.g., which may be understood to be the same reference position 304 referred to above in FIGS. 5 and 7) may be situated upon a ground plane 1302. As such, while system 100 may generate a respective perspective projection for each of the five faces of the boundary defined by reference position 304 that is not touching ground plane 1302, system 100 may abstain from generating or transmitting a perspective projection for the bottom face of the boundary that rests on ground plane 1302.

Specifically, five perspective projections may be included within the scene representation including: 1) a first pair of perspective projections generated based on a pair of perspective vantage points 1304-1 and 1304-3 and directed outwardly along the x spatial dimension, 2) a second pair of perspective projections generated based on perspective vantage points not explicitly shown in FIG. 13 that are directed outwardly along the z spatial dimension, and 3) a single perspective projection generated based on a perspective vantage point 1304-2 that is directed upward along the y spatial dimension. However, system 100 may abstain from generating or transmitting a perspective projection generated based on a perspective vantage point directed downward along the y spatial dimension (i.e., toward ground plane 1302). Additionally, along with the perspective projections generated based on perspective vantage points 1304, various orthographic projections generated based on various orthographic vantage points 1306 (e.g., similar to other orthographic vantage points described above) may also be included in the scene representation.

Figure 14A:
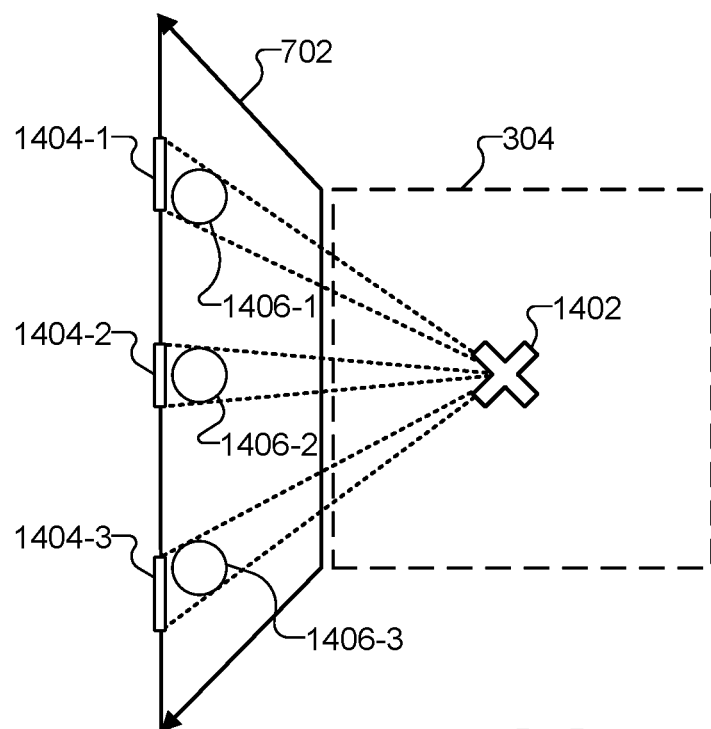
FIGS. 14A and 14B illustrate how exemplary projection gaps may be visible in perspective projections to users located at particular user positions within a virtual reality scene according to principles described herein.

Another exemplary implementation detail that may be accounted for in certain implementations of system 100 relates to gaps within perspective projections that may be visible from certain user positions within the virtual reality scene. To illustrate, FIG. 14A shows lines of sight emanating from a user position 1402 that is centered within a portion of virtual reality scene 302 defined by a particular reference position 304. Because a perspective projection generated based on a particular perspective vantage point 702 may be generated with raytracing techniques using rays that each originate and diverge from this center point (e.g., as described above in relation to FIG. 7), FIG. 14A shows that gaps 1404 (e.g., gaps 1404-1 through 1404-3) in the representations created by the shadowing of the rays by a plurality of objects 1406 (e.g., objects 1406-1 through 1406-3) are not visible from user position 1402 in the center of reference position 304.

Figure 14B:
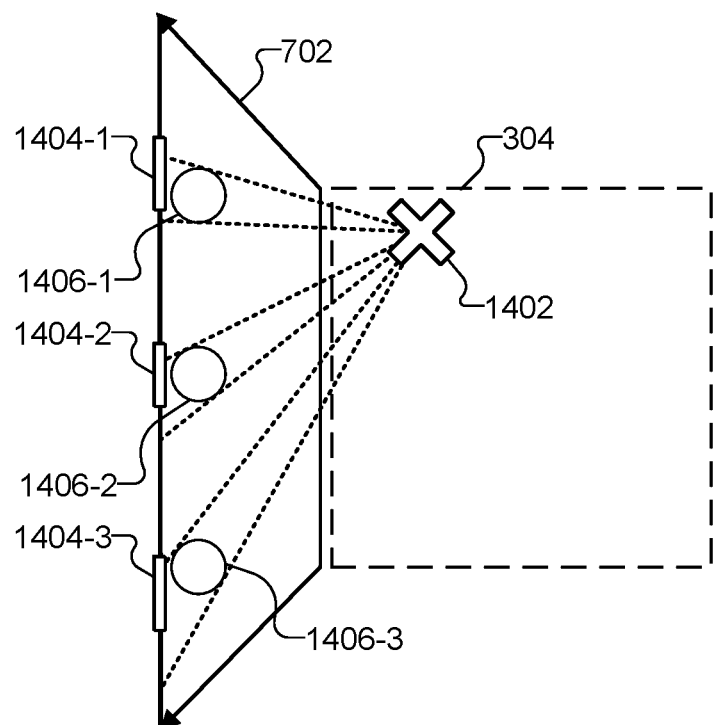

This may not be the case, however, for user positions that are not right at the center point of the reference position where the rays associated with the perspective vantage point culminate. For example, as shown in FIG. 14B, where user position 1402 has moved from the center of reference position 304 to an upper-left corner of reference position 304, certain lines of sight emanating from user position 1402 may now intersect with certain gaps 1404. Accordingly, a user at this user position 1402 may see gaps behind objects 1406 that may be distracting to the experience.

System 100 may be configured to monitor whether such gaps 1404 are visible from different points within each reference position 304, particularly for points where one or more user positions may be located. In this way, system 100 may take certain actions to reduce or eliminate gaps that may be visible to users so as to thereby ensure a quality experience for users regardless of where they are virtually located within the virtual reality scene. For example, if large gaps are visible for a certain user position, system 100 may automatically increase the size of the core portion depicted by the orthographic projections and/or may increase the size of the peripheral portion depicted by the perspective projections. In this way, the gaps may become smaller or at least farther away from the user position so as to become less noticeable. Additionally or alternatively, system 100 may alter the perspective vantage points so that rays emanate not from the center of the core portion (e.g., from center point 706), but rather may emanate from a point closer to the user position. In other examples, system 100 may perform other actions to increase quality and reduce visible gaps seen by users, or may at least monitor the gaps visible from different user positions to use this information as a quality metric for a particular virtual reality scene or virtual reality experience provided to users.

Figure 15:
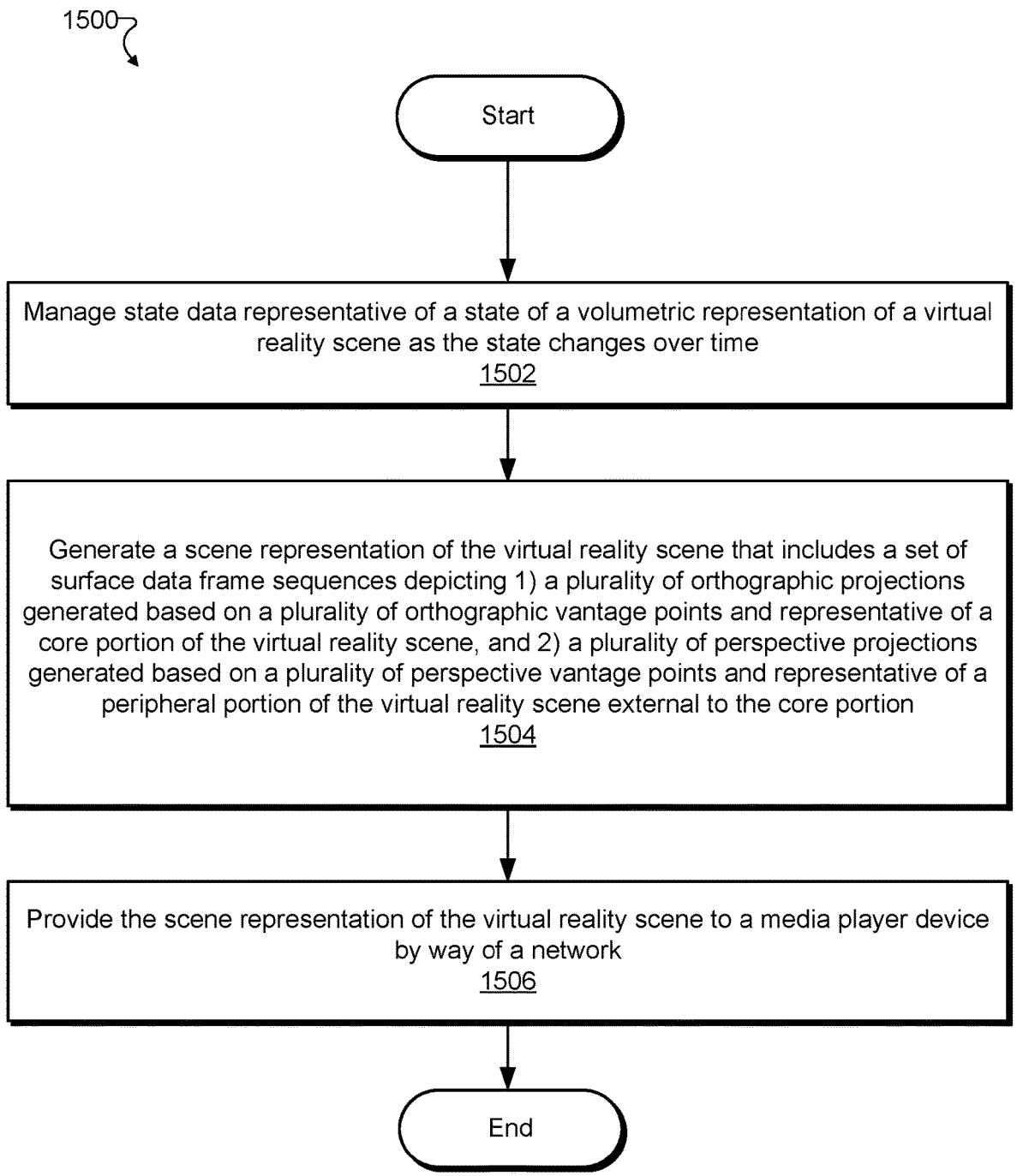
FIGS. 15 and 16 illustrate exemplary methods for representing a scene by combining perspective and orthographic projections according to principles described herein.

FIG. 15 illustrates an exemplary method 1500 for representing a scene by combining perspective and orthographic projections. While FIG. 15 illustrates exemplary operations according to one embodiment, other embodiments may omit, add to, reorder, and/or modify any of the operations shown in FIG. 15. One or more of the operations shown in FIG. 15 may be performed by system 100, any components included therein, and/or any implementation thereof.

In operation 1502, a virtual reality content generation system may manage state data for a virtual reality scene. In some examples, the state data may be representative of a state of a volumetric representation of the virtual reality scene as the state changes over time. Operation 1502 may be performed in any of the ways described herein.

In operation 1504, the virtual reality content generation system may generate a scene representation of the virtual reality scene. For example, the virtual reality content generation system may generate the scene representation based on the state data managed in operation 1502. In some implementations, the scene representation may include a set of surface data frame sequences each depicting a different projection of the virtual reality scene from a different vantage point. For example, these different projections may include a plurality of orthographic projections and a plurality of perspective projections. The plurality of orthographic projections may be generated based on a plurality of orthographic vantage points, and may be representative of a core portion of the virtual reality scene. In contrast, the plurality of perspective projections may be generated based on a plurality of perspective vantage points, and may be representative of a peripheral portion of the virtual reality scene. The peripheral portion may be external to the core portion. Operation 1504 may be performed in any of the ways described herein.

In operation 1506, the virtual reality content generation system may provide the scene representation generated in operation 1504 to a media player device by way of a network. Operation 1506 may be performed in any of the ways described herein.

Figure 16:
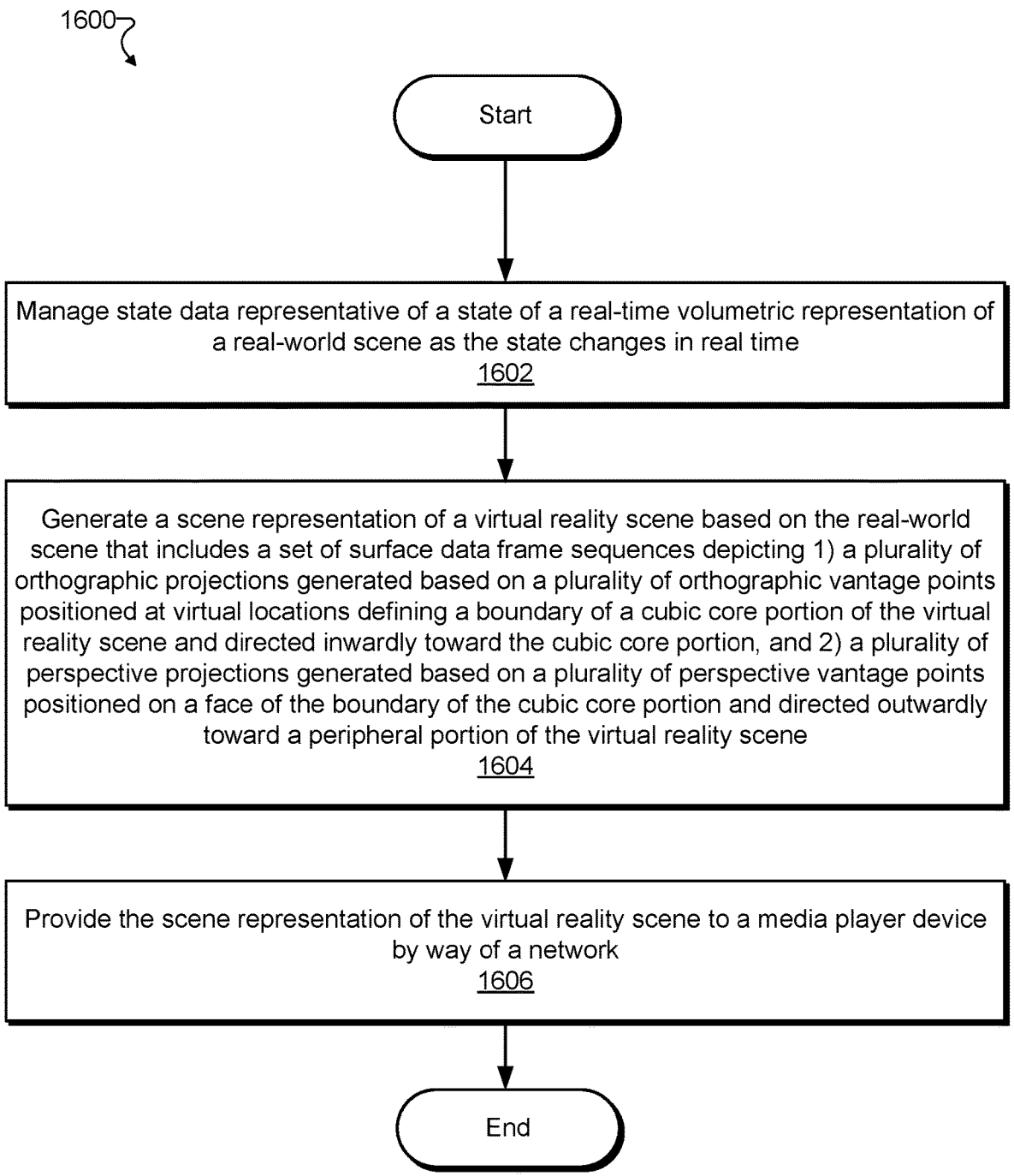

FIG. 16 illustrates an exemplary method 1600 for representing a scene by combining perspective and orthographic projections. While FIG. 16 illustrates exemplary operations according to one embodiment, other embodiments may omit, add to, reorder, and/or modify any of the operations shown in FIG. 16. One or more of the operations shown in FIG. 16 may be performed by system 100, any components included therein, and/or any implementation thereof.

In operation 1602, a virtual reality content generation system may manage state data for a virtual reality scene that is based on a real-world scene. In some examples, the state data may be representative of a state of a real-time volumetric representation of the real-world scene as the state changes in real time. Operation 1602 may be performed in any of the ways described herein.

In operation 1604, the virtual reality content generation system may generate a scene representation of the virtual reality scene based on the state data managed in operation 1602. In certain implementations, the generated scene representation may include a set of surface data frame sequences each depicting a different projection of the virtual reality scene from a different vantage point. For example, these different projections may include a plurality of orthographic projections and a plurality of perspective projections. The plurality of orthographic projections may be generated based on a plurality of orthographic vantage points positioned at virtual locations defining a boundary of a cubic core portion of the virtual reality scene. The plurality of orthographic vantage points may include pairs of orthographic vantage points each including orthographic vantage points directed inwardly toward the cubic core portion and toward one another along a different orthogonal spatial dimension. In contrast, the plurality of perspective projections may be generated based on a plurality of perspective vantage points directed outwardly away from the cubic core portion and toward a peripheral portion of the virtual reality scene. The plurality of perspective vantage points may each be positioned on a face of the boundary of the cubic core portion of the virtual reality scene such that each of the plurality of perspective projections depict a frustum-shaped volume. As such, the plurality of perspective projections, when taken together, may depict an overall volume forming a hollow cube that includes a cavity within which the cubic core portion is located. Operation 1604 may be performed in any of the ways described herein.

In operation 1606, the virtual reality content generation system may provide the scene representation generated in operation 1604 to a media player device by way of a network. Operation 1606 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 17:
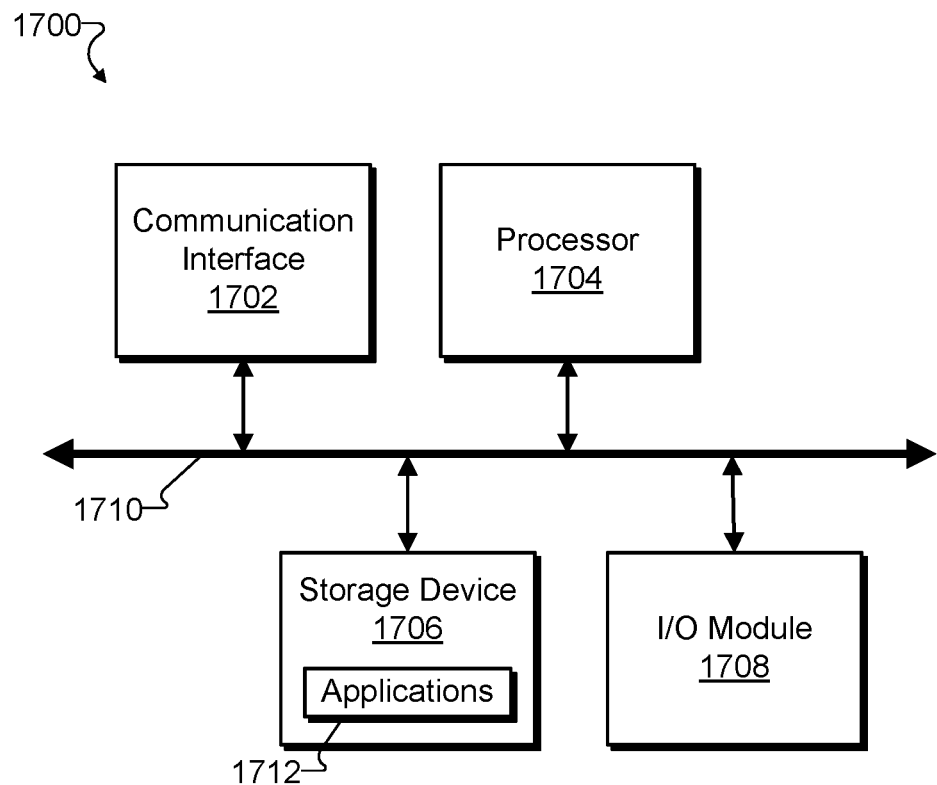
FIG. 17 illustrates an exemplary computing device according to principles described herein.

FIG. 17 illustrates an exemplary computing device 1700 that may be specifically configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit (e.g., a central processing unit and/or a graphics processing unit) capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may include one or more I/O modules configured to receive user input and provide user output. One or more I/O modules may be used to receive input for a single virtual reality experience. I/O module 1708 may include any hardware, firmware, software, or combination thereof supportive of input and output capabilities. For example, I/O module 1708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more operations or functions associated with facilities 102 through 106 of system 100 (see FIG. 1). Likewise, storage facility 108 may be implemented by or within storage device 1706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

The invention claimed is:

1. A method comprising:
   managing, by a virtual reality content generation system, state data for a virtual reality scene, the state data representative of a state of a volumetric representation of the virtual reality scene as the state changes over time;
   generating, by the virtual reality content generation system based on the state data, a scene representation of the virtual reality scene, the scene representation including a set of surface data frame sequences each depicting a different projection of the virtual reality scene from a different vantage point, the different projections including
      a plurality of orthographic projections generated based on a plurality of orthographic vantage points, the plurality of orthographic projections representative of a core portion of the virtual reality scene and including pairs of orthographic projections based on respective pairs of orthographic vantage points positioned at virtual locations defining a boundary of the core portion of the virtual reality scene, the orthographic vantage points included within each pair of orthographic vantage points directed inwardly toward one another and toward the core portion of the virtual reality scene, and
      a plurality of perspective projections generated based on a plurality of perspective vantage points, the plurality of perspective projections representative of a peripheral portion of the virtual reality scene external to the core portion; and
   providing, by the virtual reality content generation system to a media player device by way of a network, the scene representation of the virtual reality scene.

2. The method of claim 1, wherein:
   generating of the scene representation of the virtual reality scene includes generating an atlas frame sequence that includes a plurality of different views of the virtual reality scene combined onto the atlas frame sequence; and
   each different view of the virtual reality scene combined onto the atlas frame sequence includes one of the different projections of the virtual reality scene depicted by the set of surface data frame sequences.

3. The method of claim 1, wherein a boundary of the core portion of the virtual reality scene defines a particular reference position included in a plurality of reference positions associated with the virtual reality scene.

4. The method of claim 3, further comprising generating, by the virtual reality content generation system based on the state data, an additional scene representation of the virtual reality scene, the additional scene representation generated to correspond to an additional reference position included in the plurality of references positions by including an additional set of surface data frame sequences depicting additional projections including:
   an additional plurality of orthographic projections including at least one orthographic projection included in the plurality of orthographic projections; and
   an additional plurality of perspective projections that does not include any perspective projection included in the plurality of perspective projections.

5. The method of claim 1, wherein the peripheral portion of the virtual reality scene external to the core portion surrounds the core portion on every side of the core portion except a ground side of the core portion that borders a ground plane within the virtual reality scene.

6. The method of claim 1, wherein:
   the virtual reality scene is based on a real-world scene; and
   the state data for the virtual reality scene represents the state of a real-time volumetric representation of the real-world scene.

7. The method of claim 1, wherein the core portion forms a rectangular prism.

8. The method of claim 7, wherein:
   each perspective projection in the plurality of perspective projections depicts a volume of the virtual reality scene, the volume forming a frustum; and
   an overall volume depicted by a combination of each volume of each perspective projection forms a hollow rectangular prism that includes a cavity within which the rectangular prism formed by the core portion is located.

9. The method of claim 1, embodied as computer-executable instructions on at least one non-transitory computer-readable medium.

10. The method of claim 1, wherein the core portion forms a cube.

11. A method comprising:
    managing, by a virtual reality content generation system, state data for a virtual reality scene that is based on a real-world scene, the state data representative of a state of a real-time volumetric representation of the real-world scene as the state changes in real time;
    generating, by the virtual reality content generation system based on the state data, a scene representation of the virtual reality scene, the scene representation including a set of surface data frame sequences each depicting a different projection of the virtual reality scene from a different vantage point, the different projections including
       a plurality of orthographic projections generated based on a plurality of orthographic vantage points positioned at virtual locations defining a boundary of a cubic core portion of the virtual reality scene, the plurality of orthographic vantage points including pairs of orthographic vantage points each including orthographic vantage points directed inwardly toward the cubic core portion and toward one another along a different orthogonal spatial dimension, and
       a plurality of perspective projections generated based on a plurality of perspective vantage points directed outwardly away from the cubic core portion and toward a peripheral portion of the virtual reality scene, the plurality of perspective vantage points each positioned on a face of the boundary of the cubic core portion of the virtual reality scene such that each of the plurality of perspective projections depict a frustum-shaped volume and the plurality of perspective projections together depict an overall volume forming a hollow cube that includes a cavity within which the cubic core portion is located; and providing, by the virtual reality content generation system to a media player device by way of a network, the scene representation of the virtual reality scene.

12. The method of claim 11, embodied as computer-executable instructions on at least one non-transitory computer-readable medium.

13. A system comprising:
at least one physical computing device that
manages state data for a virtual reality scene, the state data representative of a state of a volumetric representation of the virtual reality scene as the state changes over time;
generates, based on the state data, a scene representation of the virtual reality scene, the scene representation including a set of surface data frame sequences each depicting a different projection of the virtual reality scene from a different vantage point, the different projections including
a plurality of orthographic projections generated based on a plurality of orthographic vantage points, the plurality of orthographic projections representative of a core portion of the virtual reality scene and including pairs of orthographic projections based on respective pairs of orthographic vantage points positioned at virtual locations defining a boundary of the core portion of the virtual reality scene, the orthographic vantage points included within each pair of orthographic vantage points directed inwardly toward one another and toward the core portion of the virtual reality scene, and
a plurality of perspective projections generated based on a plurality of perspective vantage points, the plurality of perspective projections representative of a peripheral portion of the virtual reality scene external to the core portion; and
provides the scene representation of the virtual reality scene to a media player device by way of a network.

14. The system of claim 13, wherein:
the at least one physical computing device generates the scene representation of the virtual reality scene by generating an atlas frame sequence that includes a plurality of different views of the virtual reality scene combined onto the atlas frame sequence; and
each different view of the virtual reality scene combined onto the atlas frame sequence includes one of the different projections of the virtual reality scene depicted by the set of surface data frame sequences.

15. The system of claim 13, wherein a boundary of the core portion of the virtual reality scene defines a particular reference position included in a plurality of reference positions associated with the virtual reality scene.

16. The system of claim 15, wherein the at least one physical computing device further generates, based on the state data, an additional scene representation of the virtual reality scene, the additional scene representation generated to correspond to an additional reference position included in the plurality of references positions by including an additional set of surface data frame sequences depicting additional projections including:
an additional plurality of orthographic projections including at least one orthographic projection included in the plurality of orthographic projections; and
an additional plurality of perspective projections that does not include any perspective projection included in the plurality of perspective projections.

17. The system of claim 13, wherein the peripheral portion of the virtual reality scene external to the core portion surrounds the core portion on every side of the core portion except a ground side of the core portion that borders a ground plane within the virtual reality scene.

18. The system of claim 13, wherein:
the virtual reality scene is based on a real-world scene; and
the state data for the virtual reality scene represents the state of a real-time volumetric representation of the real-world scene.

19. The system of claim 13, wherein:
the core portion forms a rectangular prism;
each perspective projection in the plurality of perspective projections depicts a volume of the virtual reality scene, the volume forming a frustum; and
an overall volume depicted by a combination of each volume of each perspective projection forms a hollow rectangular prism that includes a cavity within which the rectangular prism formed by the core portion is located.

20. The system of claim 13, wherein the core portion forms a cube.

* * * * *